(12) United States Patent
Chow et al.

(10) Patent No.: US 6,711,632 B1
(45) Date of Patent: Mar. 23, 2004

(54) METHOD AND APPARATUS FOR WRITE-BACK CACHING WITH MINIMAL INTERRUPTS

(75) Inventors: Kit M. Chow, Carlsbad, CA (US); P. Keith Muller, San Diego, CA (US); Michael W. Meyer, Encinitas, CA (US); Gary L. Boggs, Poway, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/132,441

(22) Filed: Aug. 11, 1998

(51) Int. Cl.$^7$ .......................... G06F 13/12; G06F 13/18
(52) U.S. Cl. .......................... 710/29; 710/48; 709/237; 711/143; 714/6
(58) Field of Search .......................... 711/113, 118, 711/119, 120, 143; 709/213, 237; 710/5, 29, 31, 32, 33, 48; 714/6

(56) References Cited

U.S. PATENT DOCUMENTS

| | | | |
|---|---|---|---|
| 5,014,192 A |   | 5/1991 | Mansfield et al. .......... 364/200 |
| 5,764,903 A | * | 6/1998 | Yu .......................... 395/200.38 |
| 5,802,561 A | * | 9/1998 | Fava et al. .................. 711/120 |
| 5,917,723 A | * | 6/1999 | Binford ........................ 700/2 |
| 6,035,415 A | * | 3/2000 | Fleming ...................... 714/11 |
| 6,044,367 A | * | 3/2000 | Wolff ............................ 707/2 |
| 6,065,102 A | * | 5/2000 | Peters et al. ................ 711/151 |
| 6,078,990 A | * | 6/2000 | Frazier ........................ 711/114 |
| 6,185,601 B1 | * | 2/2001 | Wolff ........................ 709/203 |
| 6,192,408 B1 | * | 2/2001 | Vahalia et al. .............. 709/229 |
| 6,247,099 B1 | * | 6/2001 | Skazinski et al. ............ 711/141 |
| 6,502,205 B1 | * | 12/2002 | Yanai et al. .................... 714/7 |
| 6,601,187 B1 | * | 7/2003 | Sicola et al. .................... 714/6 |

\* cited by examiner

*Primary Examiner*—Dung C. Dinh
(74) *Attorney, Agent, or Firm*—Gates & Cooper LLP; John D. Cowart

(57) ABSTRACT

A method and apparatus for write-back caching in a data storage and processing system has been described. The method comprises the steps of receiving a write request including write data from a compute node in a first I/O node, forwarding the write data from the first I/O node to a second I/O node, and sending an acknowledgment message to the compute node from the second I/O node after the write data is received by the second I/O node. After the data is written into non-volatile storage of the first I/O node, a purge request or command is sent to the second I/O node to purge the write data from the volatile memory of the second I/O node. In one embodiment, the purge request is not sent until the first I/O node receives a second write request, in which case, the purge request is sent in the same interrupt as the write data for the second write request. The processing system comprises a first and a second I/O node, each with means for receiving a write request from the compute node and forwarding that write data to the other I/O node. Each I/O node also comprises a means for sending an acknowledgment message back to the compute node directly, without sending the acknowledgment through the I/O node that sent the write data. The result is an I/O protocol that reduces the number of interrupts required to store data, while still implementing write back caching to improve storage speed and turnaround. The invention also can be described in terms of a program storage device, such as a hard disk, floppy disk, or a CD, which tangibly embodies instructions stored thereon for performing the instructions to practice the invention.

18 Claims, 12 Drawing Sheets

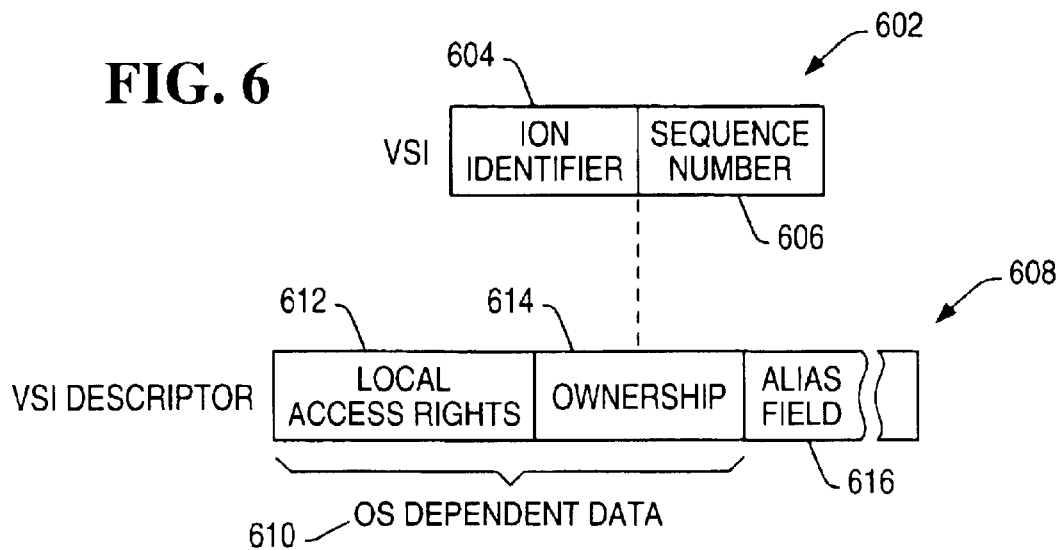
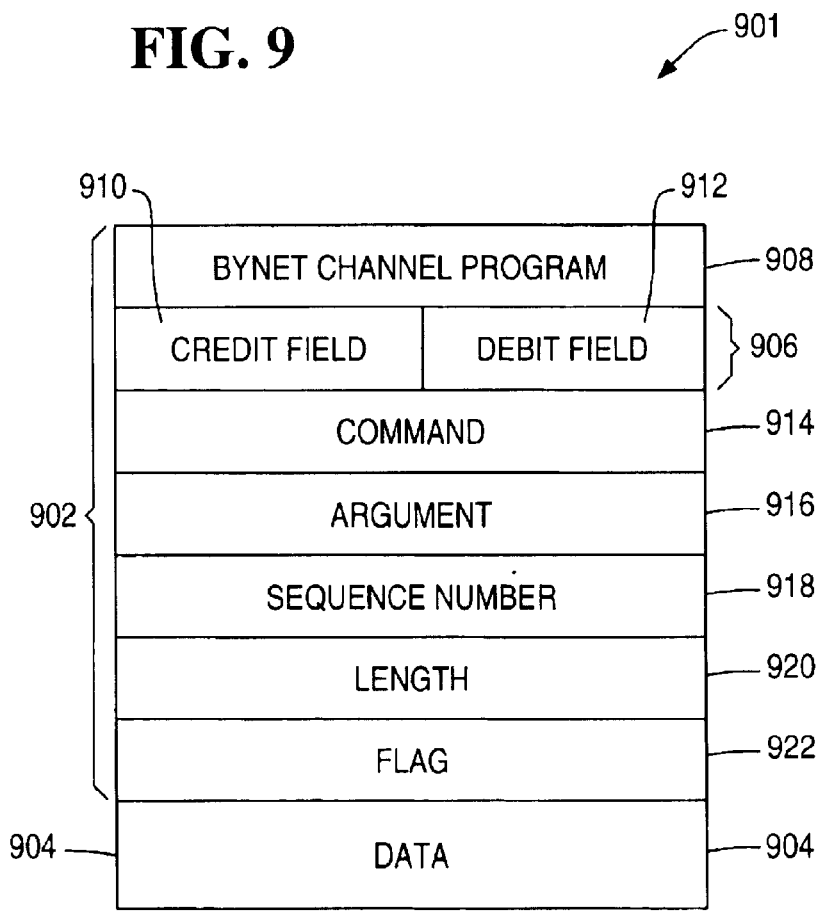

FIG. 13
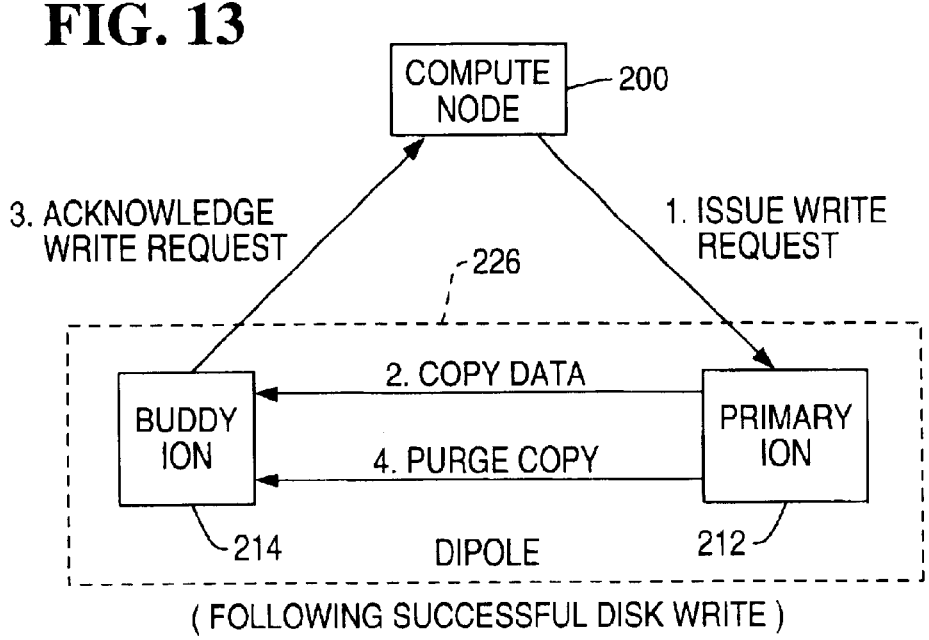
( FOLLOWING SUCCESSFUL DISK WRITE )
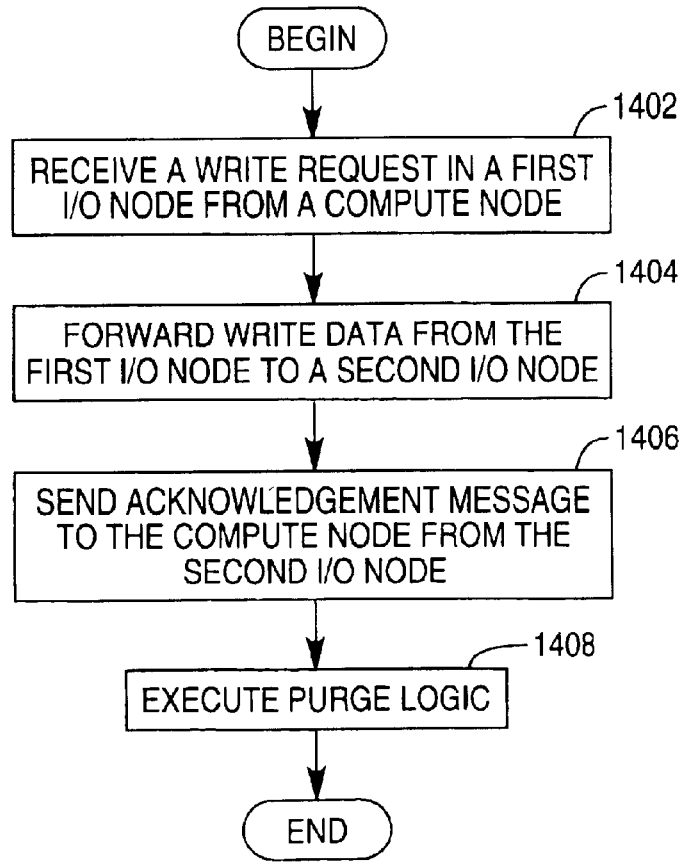
FIG. 14

METHOD AND APPARATUS FOR WRITE-BACK CACHING WITH MINIMAL INTERRUPTS

CROSS-REFERENCE TO RELATED APPLICATIONS

This application is related to the following co-pending and commonly assigned applications, each of which is hereby incorporated by reference herein:

Application Ser. No. 08/656,007, filed May 24, 1996, entitled "Reconfigurable, Fault Tolerant, Multi-Stage Interconnect Network and Protocol," by Robert J. McMillen, M. Cameron Watson, and David J. Chura, which is a continuation of U.S. Pat. No. 5,522,046, issued May 28, 1996, which is a continuation of U.S. Pat. No. 5,321,813, issued Jun. 14, 1994, attorney's docket number 5104.03;

Application Ser. No. 09/020,199, filed Feb. 6, 1998, entitled "I/O Protocol for a Highly-Configurable Multi-Node Processing System," by P. Keith Muller and Kit M. Chow, U.S. Pat. No. 6,155,122;

Application Ser. No. 09/020,200, filed Feb. 6, 1998, entitled "Name Service for a Highly-Configurable Multi-Node Processing System," by P. Keith Muller, Kit M. Chow, and Michael W. Meyer, U.S. Pat. No. 6,256,760;

Application Ser. No. 09/020,198, filed Feb. 6, 1998, entitled "Highly-Scalable Parallel Processing Computer Architecture," by P. Keith Muller, Kit M. Chow, Michael W. Meyer and Alan P. Adamson, U.S. Pat. No. 6,148,536;

Application Ser. No. 09/020,026, filed Feb. 6, 1998, entitled "Identifying At-Risk Data In Systems with Redundant Components," by Gary L. Boggs, John D. Frazier, and Gregory D. Bruno, U.S. Pat. No. 6,389,392; and Application Ser. No. 09/020,163, filed Feb. 6, 1998, entitled "Volume Set Creation Using a Single Operational View," by John D. Frazier, U.S. Pat. No. 6,139,102.

BACKGROUND OF THE INVENTION

1. Field of Invention

The present invention relates generally to computing systems, and more particularly, to a method for providing a single operational view of virtual storage allocation without regard to processor or memory cabinet boundaries.

2. Description of Related Art

Technological evolution often results from a series of seemingly unrelated technical developments. While these unrelated developments might be individually significant, when combined they can form the foundation of a major technology evolution. Historically, there has been uneven technology growth among components in large complex computer systems, including, for example, (1) the rapid advance in CPU performance relative to disk I/O performance, (2) evolving internal CPU architectures, and (3) interconnect fabrics.

Over the past ten years, disk I/O performance has been growing at a much slower rate overall than that of the node. CPU performance has increased at a rate of 40% to 100% per year, while disk seek times have only improved 7% per year. If this trend continues as expected, the number of disk drives that a typical server node can drive will rise to the point where disk drives become a dominant component in both quantity and value in most large systems. This phenomenon has already manifested itself in existing large-system installations.

Uneven performance scaling is also occurring within the CPU. To improve CPU performance, CPU vendors are employing a combination of clock speed increases and architectural changes. Many of these architectural changes are proven technologies leveraged from the parallel processing community. These changes can create unbalanced performance, leading to less than expected performance increases. A simple example; the rate at which a CPU can vector interrupts is not scaling at the same rate as basic instructions. Thus, system functions that depend on interrupt performance (such as I/O) are not scaling with compute power.

Interconnect fabrics also demonstrate uneven technology growth characteristics. For years, they have hovered around the 10–20 MB/sec performance level. Over the past year, major leaps in bandwidth to 100 MB/sec (and greater) levels have also occurred. This large performance increase enables the economical deployment of massively parallel processing systems.

This uneven performance negatively affects application architectures and system configuration options. For example, with respect to application performance, attempts to increase the workload to take advantage of the performance improvement in some part of the system, such as increased CPU performance, are often hampered by the lack of equivalent performance scaling in the disk subsystem. While the CPU could generate twice the number of transactions per second, the disk subsystem can only handle a fraction of that increase. The CPU is perpetually waiting for the storage system. The overall impact of uneven hardware performance growth is that application performance is experiencing an increasing dependence on the characteristics of specific workloads.

Uneven growth in platform hardware technologies also creates other serious problems; a reduction in the number of available options for configuring multi-node systems. A good example is the way the software architecture of a TERADATA® four-node clique is influenced by changes in the technology of the storage interconnects. The TERADATA® clique model expects uniform storage connectivity among the nodes in a single clique; each disk drive can be accessed from every node. Thus when a node fails, the storage dedicated to that node can be divided among the remaining nodes. The uneven growth in storage and node technology restricts the number of disks that can be connected per node in a shared storage environment. This restriction is created by the number of drives that can be connected to an I/O channel and the physical number of buses that can be connected in a four-node shared I/O topology. As node performance continues to improve, we must increase the number of disk spindles connected per node to realize the performance gain.

Cluster and massively parallel processing (MPP) designs are examples of multi-node system designs which attempt to solve the foregoing problems. Clusters suffer from limited expandability, while MPP systems require additional software to present a sufficiently simple application model (in commercial MPP systems, this software is usually a DBMS). MPP systems also need a form of internal clustering (cliques) to provide very high availability. Both solutions still create challenges in the management of the potentially large number of disk drives, which, being electromechanical devices, have fairly predictable failure rates. Issues of node interconnect are exacerbated in MPP systems, since the number of nodes is usually much larger. Both approaches also create challenges in disk connectivity, again fueled by the large number of drives needed to store very large databases.

The foregoing problems are ameliorated in an architecture wherein storage entities and compute entities, computing over a high performance connectivity fabric, act as architectural peers. This architecture allows increased flexibility in managing storage and compute resources. However, this flexibility presents some unique problems. One such problem maintaining the speed and flexibility offered by the architecture, while still assuring secure storage of data.

In traditional architectures, efficient storage of data is enabled by the technique of write back caching. Data normally written to the disk by the CPU is first written into a write back cache. The data is then written to the disk during idle CPU cycles. This technique improves performance because a write to the write back cache can occur faster than to the disk or to RAM.

The use of a write back cache for disks also adds a degree of risk, because the data stays in the volatile memory of the disk device for a longer period of time before it is written to the disk media. Even though the period of time involved is typically a few seconds at most, the data may be lost if there is a crash or system failure before the data can be written to non-volatile storage.

Write back caching can be used with highly distributed architectures as well. However, when write back cache protocols are implemented in such architectures, they require considerable communication and transaction overhead between the compute nodes and the storage media, reducing the speed and efficiency of the system. What is needed is a protocol for efficient write-back caching of data in distributed architectures. The present invention satisfies that need.

SUMMARY OF THE INVENTION

The present invention describes a method and apparatus for write-back caching in a data storage and processing system. The method comprises the steps of receiving a write request including write data from a compute node in a first I/O node, forwarding the write data from the first I/O node to a second I/O node, and sending an acknowledgment message to the compute node from the second I/O node after the write data is received by the second I/O node. After the data is written into non-volatile storage of the first I/O node, a purge request or command is sent to the second I/O node to purge the write data from the volatile memory of the second I/O node. In one embodiment, the purge request is not sent until the first I/O node receives a second write request, in which case, the purge request is sent in the same interrupt as the write data for the second write request. The processing system comprises a first and a second I/O node, each with means for receiving a write request from the compute node and forwarding that write data to the other I/O node. Each I/O node also comprises a means for sending an acknowledgment message back to the compute node directly, without sending the acknowledgment through the I/O node that sent the write data. The result is an I/O protocol that reduces the number of interrupts required to store data, while still implementing write back caching to improve storage speed and turnaround. The invention also can be described in terms of a program storage device, such as a hard disk, floppy disk, or a CD, which tangibly embodies instructions stored thereon for performing the instructions to practice the invention.

BRIEF DESCRIPTION OF THE DRAWINGS

FIG. 6 is a diagram showing the structure of fabric unique IDs;

FIG. 9 is a diagram of the PIT header;

FIG. 13 is a diagram showing an efficient protocol for writing data to a disk in an ION dipole;

FIG. 14 is a flow chart showing the operations used to practice one embodiment of the write-back caching protocol of the present invention;

DETAILED DESCRIPTION OF THE PREFERRED EMBODIMENT

A. Overview

Figure 1:
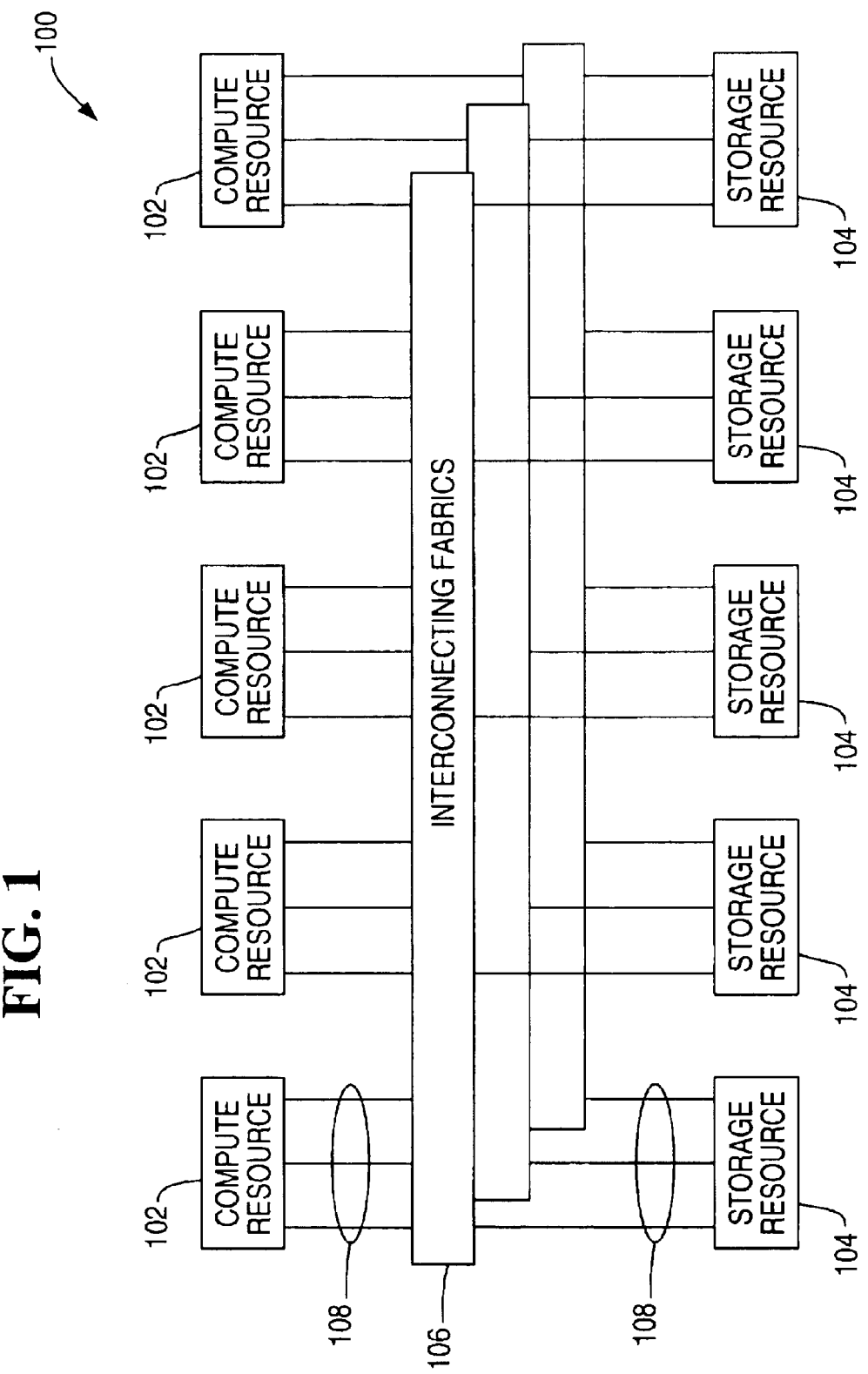
FIG. 1 is a top level block diagram of the present invention showing the key architectural elements.

FIG. 1 is an overview of the peer-to-peer data processing architecture of the present invention. This architecture 100 comprises one or more compute resources 102 and one or more storage resources 104, communicatively coupled to the compute resources 102 via one or more interconnecting fabrics 106 and communication paths 108. The fabrics 106 provide the communication medium between all the nodes and storage, thus implementing a uniform peer access between compute resources 102 and storage resources 104.

In the architecture shown in FIG. 1, storage is no longer bound to a single set of nodes as it is in current node-centric architectures, and any node can communicate with all of the storage. This contrasts with today's multi-node systems where the physical system topology limits storage and node communication, and different topologies were often necessary to match different workloads. The architecture shown in FIG. 1 allows the communication patterns of the application software to determine the topology of the system at any given instance of time by providing a single physical architecture that supports a wide spectrum of system topologies, and embraces uneven technology growth. The isolation provided by the fabric 106 enables a fine grain scaling for each of the primary system components.

Figure 2:
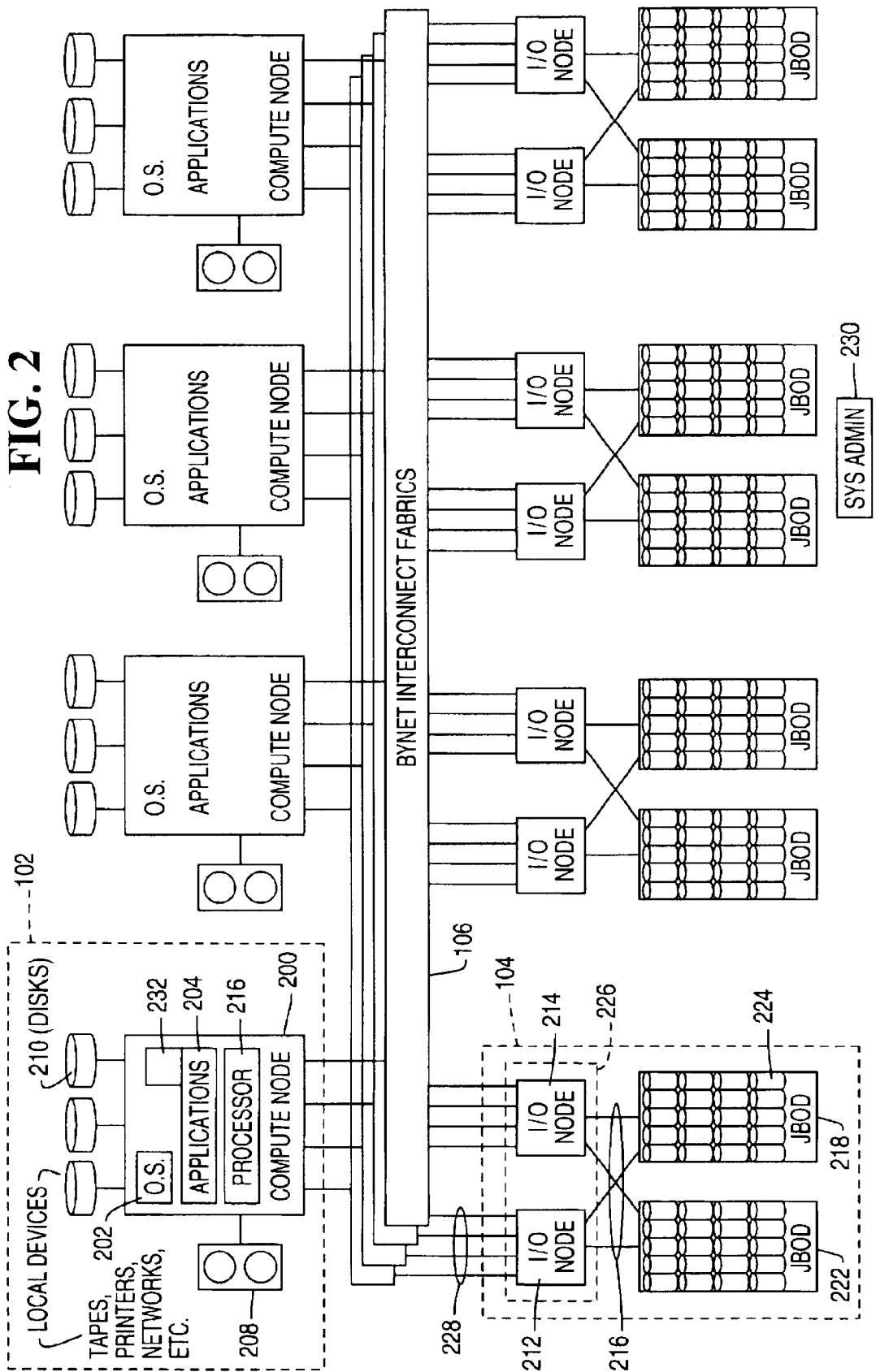
FIG. 2 is a system block diagram of the present invention.

FIG. 2 presents a more detailed description of the peer-to-peer architecture of the present invention. Compute resources 102 are defined by one or more compute nodes 200, each with one or more processors 216 implementing one or more applications 204 under control of an operating system 202. Operatively coupled to the compute node 200 are peripherals 208 such as tape drives, printers, or other networks. Also operatively coupled to the compute node 200 are local storage devices 210 such as hard disks, storing compute node 200 specific information, such as the instructions comprising the operating system 202, applications 204, or other information. Application instructions may be stored and/or executed across more than one of the compute nodes 200 in a distributed processing fashion. In one embodiment, processor 216 comprises an off-the-shelf commercially available multi-purpose processor, such as the INTEL P6, and associated memory and I/O elements.

Storage resources 104 are defined by cliques 226, each of which include a first I/O node or ION 212 and a second I/O node or ION 214, each operatively coupled by system interconnect 228 to each of the interconnect fabrics 106. The first ION 212 and second ION 214 are operatively coupled to one or more storage disks 224 (known as "just a bunch of disks" or JBOD), associated with a JBOD enclosure 222.

FIG. 2 depicts a moderate-sized system, with a typical two-to-one ION 212 to compute node ratio. The clique 226 of the present invention could also be implemented with three or more IONs 214, or with some loss in storage node availability, with a single ION 212. Clique 226 population is purely a software matter as there is no shared hardware among IONs 212. Paired IONs 212 may be referred to as "dipoles."

The present invention also comprises a management component or system administrator 230 which interfaces with the compute nodes 200, IONs 212, and the interconnect fabrics 106.

Connectivity between IONs 212 and JBODs 222 are shown here in simplified form. Actual connectivity uses Fibre Channel cables to each of the ranks (rows, here four rows) of storage disks 224 in the illustrated configuration. In practice, it is probable that each ION 212 would manage between forty and eighty storage disks 224 rather than the twenty shown in the illustrated embodiment.

B. IONs (Storage Nodes)

1. Internal Architecture a) Hardware Architecture

Figure 3:
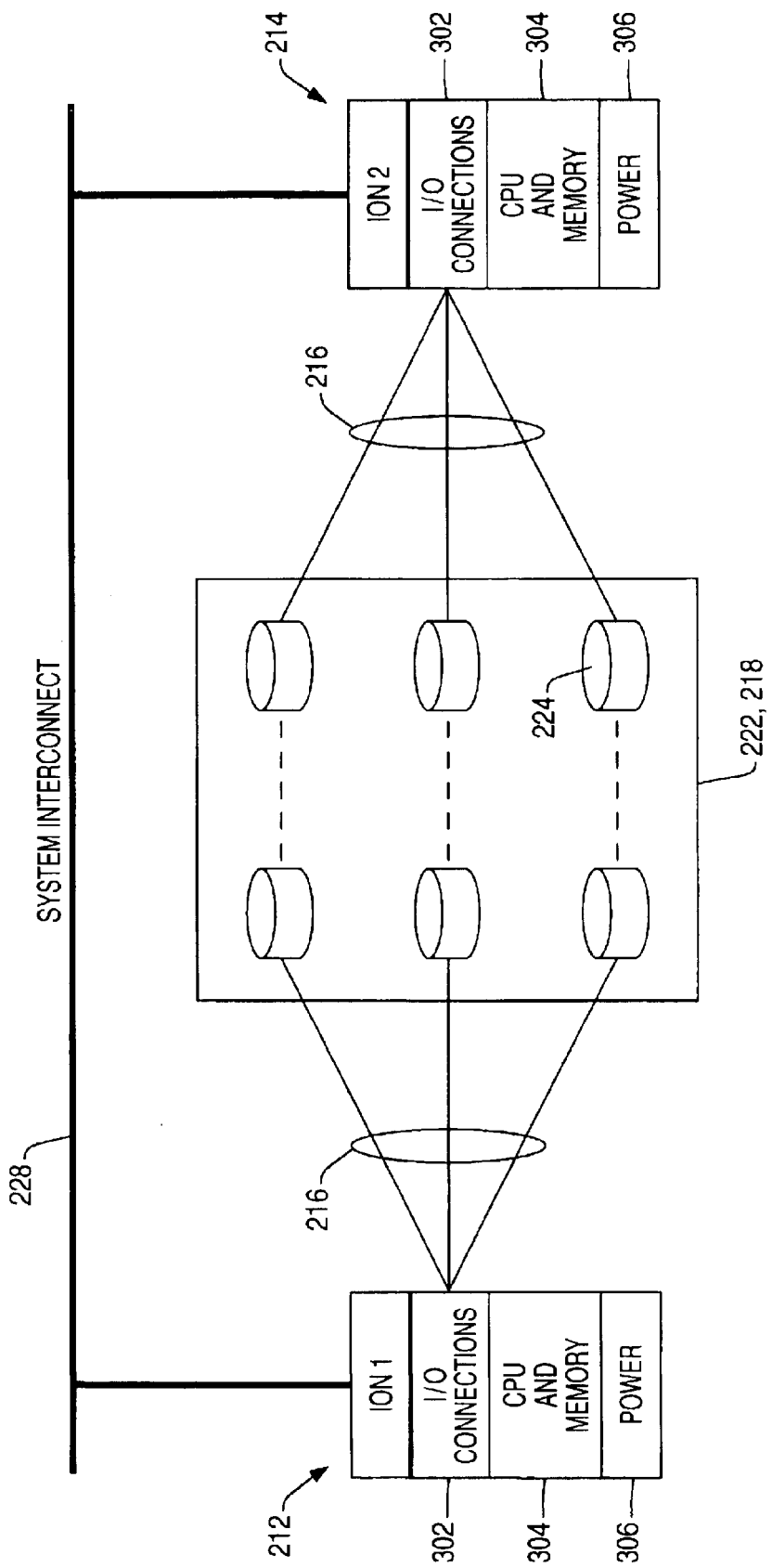
FIG. 3 is a block diagram showing the structure of the IONs and the system interconnect.

FIG. 3 is a diagram showing further detail regarding the ION 212 configuration and its interface with the JBODs 222. Each ION 212 comprises an I/O connection module 302 for communicative coupling with each storage disk 224 in the JBOD 222 array via JBOD interconnect 216, a CPU and memory 304 for performing the ION 212 functions and implementing the ION physical disk drivers 500 described herein, and a power module 306 for providing power to support ION 212 operation.

b) JBODs

Figure 4:
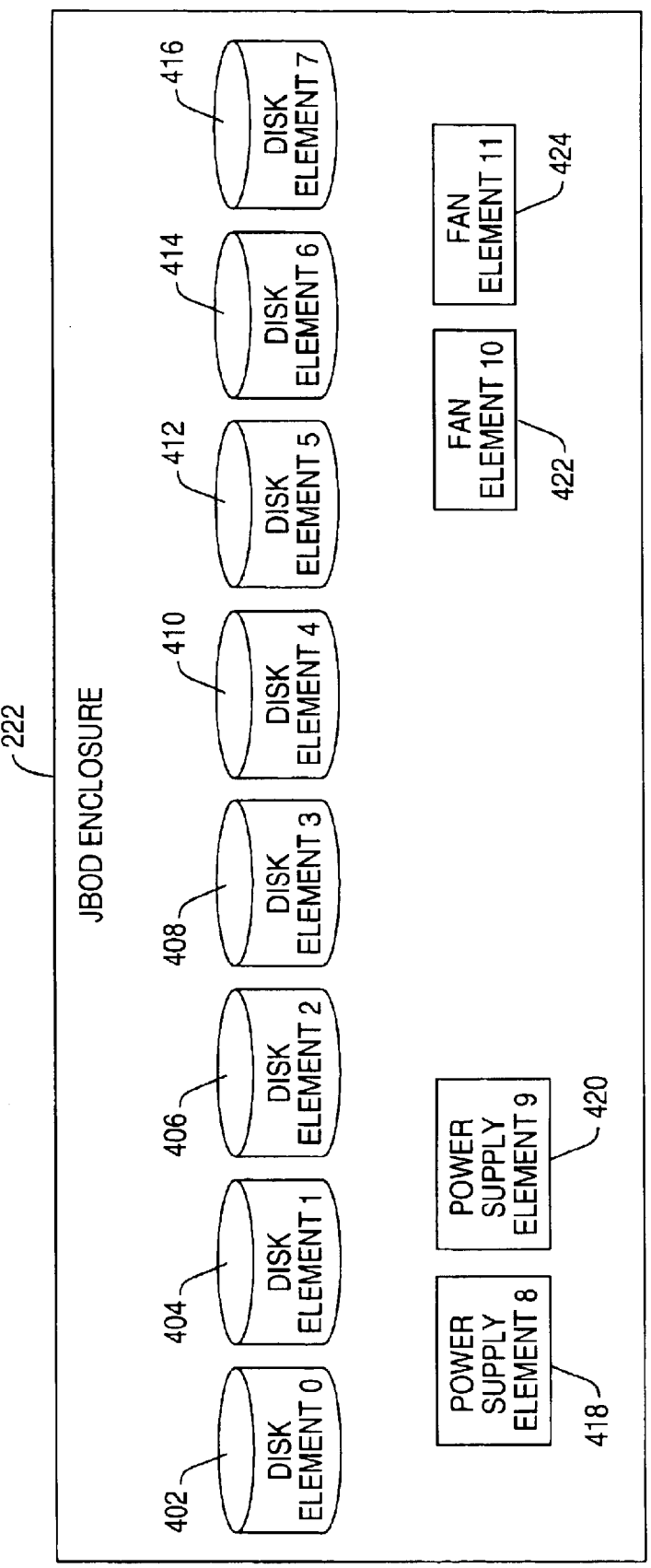
FIG. 4 is a block diagram of the elements in a JBOD enclosure.

FIG. 4 is a diagram showing further detail regarding the JBOD enclosure 222. All components in a JBOD enclosure 222 that can be monitored or controlled are called elements 402–424. All elements 402–424 for a given JBOD enclosure are returned through a receive diagnostic results command with the configuration page code. The ION 212 uses this ordered list of elements to number the elements. The first element 402 described is element 0, second element 404 is element 1, etc. These element numbers are used when creating LUN_C's that are used by the management service layer 706 described herein to address components.

TABLE I

| Bytes | Bits | | | | | | | |
|---|---|---|---|---|---|---|---|---|
| | 7 | 6 | 5 | 4 | 3 | 2 | 1 | 0 |
| 0 | 1 | 0 | | Element number | | | | |
| 1 | Rack Number | | | Chassis Position | | | | |

Within the enclosure, element location is specified by rack, chassis and element number, as shown in Table 1 above. Rack Number is a number internal to the dipole which is assigned to a rack belonging to the dipole. Chassis Position refers to the height reported by the cabinet management devices. The element number is an index into the element list returned by SES Configuration Page. These fields make up the LUN_C format.

c) I/O Interface Driver Architecture

Figure 5:
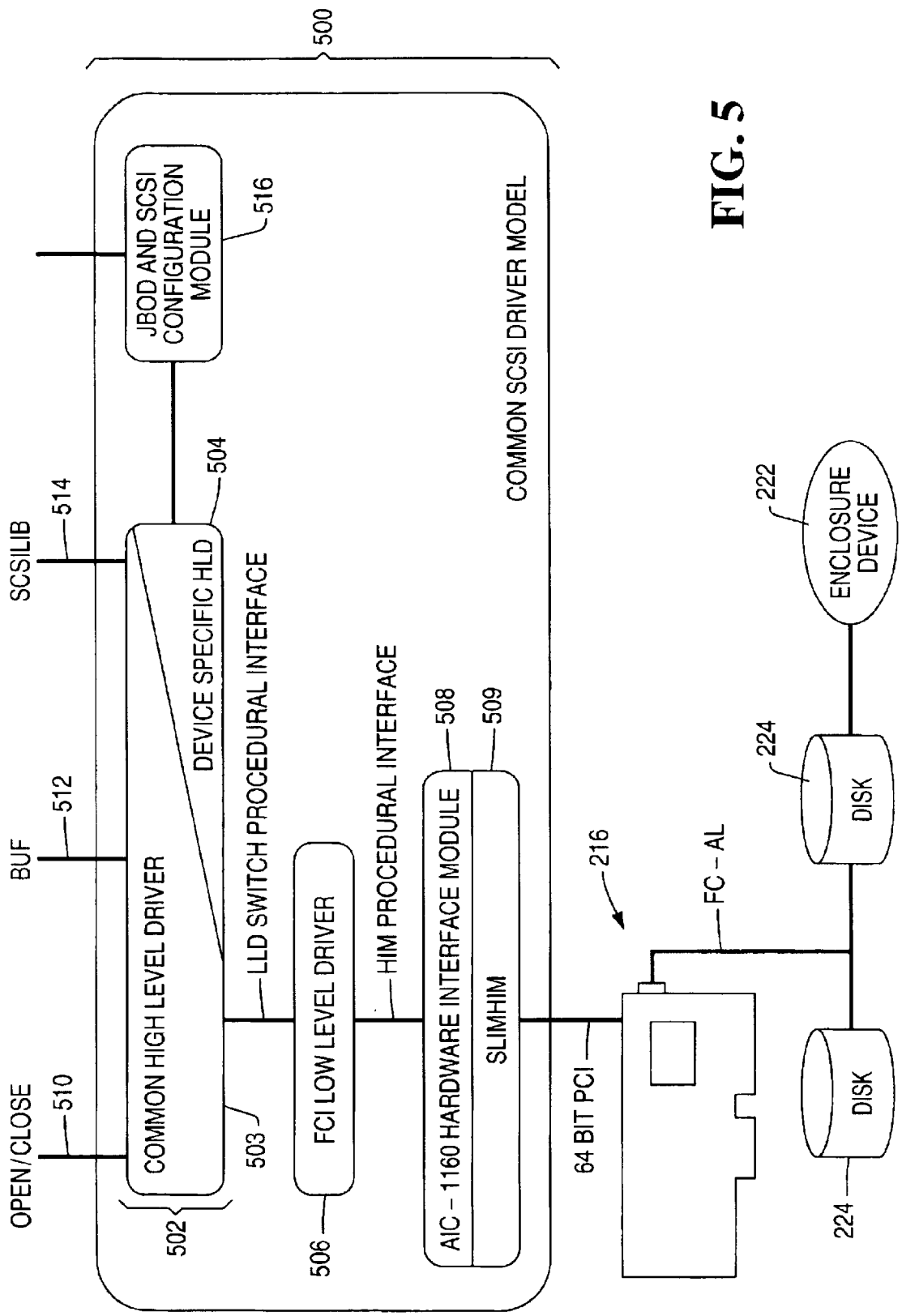
FIG. 5 is a functional block diagram of the ION physical disk driver.

FIG. 5 is a diagram showing the ION 212 I/O architecture, including the ION physical disk driver 500, which acts as a "SCSI Driver" for the ION 212. The ION physical disk driver 500 is responsible for taking I/O requests from the RAID (redundant array of inexpensive disks) software drivers or management utilities in the system administrator 230 and execute the request on a device on the device side of the JBOD interconnect 216.

The physical disk driver 500 of the present invention includes three major components: a high level driver (HLD) 502, a device-specific high level driver 504, and a low level driver 506. The HLD 502 comprises a common portion 503 and a device specific high level portion 504, and low level driver 506. The common and device specific high level drivers 502 and 504 are adapter-independent and do not require modification for new adapter types. The Fibre Channel Interface (FCI) low level driver 506 supports fibre channel adapters, and is therefore protocol specific rather than adapter specific.

The FCI low level driver 506 translates SCSI requests to FCP frames and handles fibre channel common services like Login and Process Login. Operatively coupled to the FCI low level driver 506 is a hardware interface module (HIM) Interface 508, which splits the fibre channel protocol handling from the adapter specific routines. A more detailed description of the foregoing components is presented below.

(1) High Level Driver

The High Level Driver (HLD) 502 is the entry point for all requests to the ION 212 no matter what device type is being accessed. When a device is opened, the HLD 502 binds command pages to the device. These vendor-specific command pages dictate how a SCSI command descriptor block is to be built for a specific SCSI function. Command pages allow the driver to easily support devices that handle certain SCSI functions differently than the SCSI Specifications specify.

(a) Common (Non-Device Specific) Portion

The common portion of the HLD 502 contains the following entry points:

| | |
|---|---|
| cs_init | Initialize driver structures and allocate resources. |
| cs_open | Make a device ready for use. |
| cs_close | Complete I/O and remove a device from service. |
| cs_strategy | Block device read/write entry (Buf_t interface). |
| cs_intr | Service a hardware interrupt. |

These routines perform the same functions for all device types. Most of these routines call device specific routines to handle any device specific requirements via a switch table indexed by device type (disk, tape, WORM, CD-ROM, etc.).

The cs_open function guarantees that the device exists and is ready for I/O operations to be performed on it. Unlike current system architectures, the common portion 503 does not create a table of known devices during initialization of the operating system (OS). Instead, the driver common portion 503 is self-configuring: the driver common portion 503 determines the state of the device during the initial open of that device. This allows the driver common portion 503 to "see" devices that may have come on-line after the OS 202 initialization phase.

During the initial open, SCSI devices are bound to a command page by issuing a SCSI Inquiry command to the target device. If the device responds positively, the response data (which contains information such as vendor ID, product ID, and firmware revision level) is compared to a table of known devices within the SCSI configuration module 516. If a match is found, then the device is explicitly bound to the command page specified in that table entry. If no match is found, the device is then implicitly bound to a generic CCS (Common Command Set) or SCSI II command page based on the response data format.

The driver common portion 503 contains routines used by the low level driver 506 and command page functions to allocate resources, to create a DMA list for scatter-gather operations, and to complete a SCSI operation.

All FCI low level driver 506 routines are called from the driver common portion 503. The driver common portion 503 is the only layer that actually initiates a SCSI operation by calling the appropriate low level driver (LLD) routine in the hardware interface module (HIM) 508 to setup the hardware and start the operation. The LLD routines are also accessed via a switch table indexed by a driver ID assigned during configuration from the SCSI configuration module 516.

(b) Device Specific Portion

The interface between the common portion 502 and the device specific routines 504 are similar to the interfaces to the common portion, and include csxx__init, csxx__open, csxx__close, and csxx__strategy commands. The "xx" designation indicates the storage device type (e.g. "dk" for disk or "tp" for tape). These routines handle any device specific requirements. For example, if the device were a disk, csdk__open must read the partition table information from a specific area of the disk and csdk__strategy must use the partition table information to determine if a block is out of bounds. (Partition Tables define the logical to physical disk block mapping for each specific physical disk.)

(c) High Level Driver Error/Failover Handling (i) Error Handling (a) Retries

The HLD's 502 most common recovery method is through retrying I/Os that failed. The number of retries for a given command type is specified by the command page. For example, since a read or write command is considered very important, their associated command pages may set the retry counts to 3. An inquiry command is not as important, but constant retries during start-of-day operations may slow the system down, so its retry count may be zero.

When a request is first issued, its retry count is set to zero. Each time the request fails and the recovery scheme is to retry, the retry count is incremented. If the retry count is greater than the maximum retry count as specified by the command page, the I/O has failed, and a message is transmitted back to the requester. Otherwise, it is re-issued. The only exception to this rule is for unit attentions, which typically are event notifications rather than errors. If a unit attention is received for a command, and its maximum retries is set to zero or one, the High Level Driver 502 sets the maximum retries for this specific I/O to 2. This prevents an I/O from prematurely being failed back due to a unit attention condition.

A delayed retry is handled the same as the retry scheme described above except that the retry does not get replaced onto the queue for a specified amount of time.

(b) Failed Scsi__ops

A Scsi__op that is issued to the FCI low level driver 506 may fail due to several circumstances. Table II below shows possible failure types the FCI low level driver 506 can return to the HLD 502.

TABLE II

Low Level Driver Error Conditions

| Error | Error Type | Recovery | Logged |
|---|---|---|---|
| No Sense | Check Condition | This is not considered an error. Tape devices typically return this to report Illegal Length Indicator. This should not be returned by a disk device. | YES |
| Recovered Error | Check Condition | This is not considered an error. Disk devices return this to report soft errors. | YES |
| Not Ready | Check Condition | The requested I/O did not complete. For disk devices, this typically means the disk has not spun up yet. A Delayed Retry will be attempted. | YES |
| Medium Error | Check Condition | The I/O for the block request failed due to a media error. This type of error typically happens on reads since media errors upon write are automatically reassigned which results in Recovered Errors. These errors are retried. | YES |
| Hardware Error | Check Condition | The I/O request failed due to a hardware error condition on the device. These errors are retried. | YES |
| Illegal Request | Check Condition | The I/O request failed due to a request the device does not support. Typically these errors occur when applications request mode pages that the device does not support. These errors are retried. | YES |
| Unit Attention | Check Condition | All requests that follow a device power-up or reset fail with Unit Attention. These errors are retried. | NO |
| Reservation Conflict | SCSI Status | A request was made to a device that was reserved by another initiator. These errors are not retried. | YES |
| Busy | SCSI Status | The device was too busy to fulfill the request. A Delayed retry will be attempted. | YES |
| No Answer | SCSI/Fibre Channel | The device that an I/O request was sent to does not exist. These errors are retried. | YES |
| Reset | Low Level Driver | The request failed because it was executing on the adapter when the adapter was reset. The Low Level Driver does all error handling for this condition. | YES |
| Timeout | Low Level Driver | The request did not complete within a set period of time. The Low Level Driver does all handling for this condition. | YES |
| Parity Error | Low Level Driver | The request failed because the Low Level Driver detected a parity error during the DMA operation. These will typically be the | YES |

TABLE II-continued

Low Level Driver Error Conditions

| Error | Error Type | Recovery | Logged |
|---|---|---|---|
| | | result of PCI parity errors. This request will be retried. | |

(c) Insufficient Resources

Insufficient resource errors occur when some desirable resource is not available at the time requested. Typically these resources are system memory and driver structure memory.

Insufficient system memory handling is accomplished through semaphore blocking. A thread that blocks on a memory resource will prevent any new I/Os from being issued. The thread will remain blocked until an I/O completion frees memory.

Driver structure resources are related to the Scsi_op and I/O vector (IOV) list pools. The IOV list is a list of memory start and length values that are to be transferred to or from disk. These memory pools are initialized at start-of-day by using a tunable parameter to specify the size of the pools. If Scsi_op or IOV pools are empty, new I/O will result in the growth of these pools. A page (4096 bytes) of memory is allocated at a time to grow either pool. Not until all Scsi_ops or IOV from the new page are freed is the page freed. If an ION 212 is allocating and freeing pages for Scsi_ops or pages constantly, it may be desirable to tune the associated parameters.

All insufficient resource handling are logged through events.

(ii) Start Of Day Handling

At start of day, the HLD 502 initializes its necessary structures and pools, and makes calls to initialize adapter specific drivers and hardware. Start of day handling is started through a call to cs_init( ) which (1) allocates Scsi_Op pools; (2) allocates IOV pools; (3) makes calls to FCIhw_init( ) to initialize Fibre Channel structures and hardware; and (4) binds interrupt service routine cs_intr( ) to appropriate interrupt vectors.

(iii) Failover Handling

The two halves of the ION 212 dipole are attached to a common set of disk devices. At any given time both IONs 212 and 214 in a dipole 226 must be able to access all devices. From the HLD's 502 perspective, there is no special handling for failovers.

(2) Command Pages

The IONs 212 of the present invention use a command page method which abstracts the common portion and device specific portions from the actual building of the SCSI command. A Command Page is a list of pointers to functions where each function represents a SCSI command (e.g. SCSI_2_Test_Unit_Ready). As mentioned above, a specific command page is bound to a device on the initial open or access of that device. All vendor unique and non-compliant SCSI device quirks are managed by the functions referenced via that device's specific command page. A typical system would be shipped with the command control set (CCS), SCSI I and SCSI II pages and vendor-unique pages to allow integration of non-compliant SCSI devices or vendor unique SCSI commands.

Command page functions are invoked from the device common portion 503, device specific portion 504, and the FCI low level driver 506 (Request Sense) through an interface called the Virtual DEVice (VDEV) interface. At these levels, software doesn't care which SCSI dialect the device uses but simply that the device performs the intended function.

Each command page function builds a SCSI command and allocates memory for direct memory access (DMA) data transfers if necessary. The function then returns control to the driver common portion 503. The driver common portion 503 then executes the command by placing the SCSI operation on a queue (sorting is done here if required) and calling the FCI low level driver's 506 start routine. After the command has executed, if a "Call On Interrupt" (COI) routine exists in the command page function, the COI will be called before the driver common portion 503 of the driver examines the completed command's data/information. By massaging the returned data/information, the COI can transform non-conforming SCSI data/information to standard SCSI data/information. For example, if a device's Inquiry data contains the vendor ID starting in byte 12 instead of byte 8, the command page function for Inquiry will contain a COI that shifts the vendor ID into byte 8 of the returned Inquiry data. The driver common portion 503 will always extract the vendor ID information beginning at byte 8 and thus does not need to know about the non-conforming device.

(3) JBOD And SCSI Configuration Module

An important function of RAID controllers is to secure data from loss. To perform this function, the RAID software must know physically where a disk device resides and how its cabling connects to it. Hence, an important requirement of implementing RAID controller techniques is the ability to control the configuration of the storage devices. The JBOD portion of the JBOD and SCSI Configuration Module 516 is tasked with defining a static JBOD configuration for the ION 212. Configuration information described by the JBOD and SCSI Configuration Module 516 is shown in Table III.

TABLE III

| Item | Description |
|---|---|
| SCSI/Fibre Channel Adapters | The location of each adapter is described. The location will indicate what PCI slot (or what PCI bus and device number) each SCSI/Fibre Channel Adapter is plugged into. |
| Disk Devices | A list of addresses of all disk devices. An address includes an adapter number and disk ID. The disk ID will be represented by either a SCSI ID or AL PA. |
| JBOD Chassis | A list of addresses of JBOD Chassis. The address includes a logical rack ID and elevation. Each Chassis will have associated with it a list of address of disk devices that are attached to the JBOD. The address(es) of the SES devices that manage of chassis can also be obtained. |

In addition to the physical location information of adapters, JBOD enclosure 222 and storage disks 224, other configuration information like FCI low level driver 506 and driver device specific portion 504 entry points as well as Command Page definitions must be described. A space.c file is used to provide this information, and the ION 212 builds the configuration information at ION physical disk driver 500 compile time. In cases where supported ION 212 configurations are changed, a new version of the ION physical disk drivers 500 must be compiled.

(4) Fibre Channel Interface (FCI) Low Level Driver

The FCI low level driver 506 manages the SCSI interface for the high level driver 502. The interface between the driver common portion 503 and the FCI low level driver 506 includes the following routines, where the "xx" indication is a unique identifier for the hardware that the FCI low level driver 506 controls (e.g. FCIhw_init).:

| | |
|---|---|
| xxhw_init | Initialize the hardware. |
| xxhw_open | Determine current status of host adapter. |
| xxhw_config | Set up host adapter's configuration information (SCSI ID, etc.) |
| xxhw_start | Initiate a SCSI operation, if possible. |
| xxhw_intr | Process all SCSI interrupts. |

The low level driver is a pure SCSI driver in that it neither knows or cares about the specifics of a device but instead is simply a conduit for the SCSI commands from the upper level. The interrupt service routines, hardware initialization, mapping and address translation, and error recovery routines reside in this layer. In addition, multiple types of low level drivers can coexist in the same system. This split between the hardware-controlling layer and the remainder of the driver allows the same high level driver to run on different machines.

The basic functions of the FCI module are to (1) interface with the SCSI High Level Driver (SHLD) to translate SCSI Ops to an FCI work object structure (I/O Block (IOB)); (2) provide a common interface to facilitate support for new fibre channel adapters through different HIMs 508; (3) provide FC-3 Common Services which may be used by any FC-4 protocol layer (Fibre Channel Protocol (FCP) in the illustrated embodiment); (4) provide timer services to protect asynchronous commands sent to the HIM (e.g. FCP Commands, FC-3 Commands, LIP Commands) in case the HIM 508 or hardware does not respond; (5) manage resources for the entire Fibre Channel Driver (FCI and HIM), including (a) I/O request blocks (IOBs), (b) vector tables (c) HIM 508 Resources (e.g. Host Adapter Memory, DMA Channels, I/O Ports, Scratch Memory); (6) optimize for Fibre Channel arbitrated loop use (vs. Fibre Channel Fabric).

A list of important data structures for the FCI low level driver 506 are indicated in Table IV below:

TABLE IV

FC Key Data Structures

| Structure Name | Memory Type | Description |
|---|---|---|
| HCB | Private | Hardware Control Block. Every Five Channel Adapter has associated with it a single HCB structure which is initialized at start of day. The HCB describes the adapter's capabilities as well as being used to manage adapter specific resources. |
| IOB | Private | IO Request Block. Used to describe a single I/O request. All I/O requests to the HIM layer use IOBs to describe them. |
| LINK_MANAGER | Private | A structure to manage the link status of all targets on the loop. |

(a) Error Handling

Errors that the FCI low level driver 506 handles tend to be errors specific to Fibre Channel and/or FCI itself.

(i) Multiple Stage Error Handling

The FCI low level driver 506 handles certain errors with multiple stage handling. This permits error handling techniques to be optimized to the error type. For example, if a lesser destructive procedure is used and does not work, more drastic error handling measures may be taken.

(ii) Failed IOBs

All I/O requests are sent to the HIM 508 through an I/O request block. The following are the possible errors that the HIM 508 can send back.

TABLE V

HIM Error Conditions

| Error | Error Type | Recovery | Logged |
|---|---|---|---|
| Queue Full | SCSI/FCP Status | This error should not be seen if the IONs 212 are properly configured, but if it is seen, the I/O will be placed back onto the queue to be retried. An I/O will never be failed back due to a Queue Full. | YES |
| Other | SCSI/FCP Status | Other SCSI/FCP Status errors like Busy and Check Condition is failed back to the High Level Driver 502 for error recovery. | NO (HLD does necessary logging) |
| Invalid D_ID | Fibre Channel | Access to a device that does not exist was attempted. Treated like a SCSI Selection Timeout is sent back to High Level Driver for recovery. | NO |
| Port Logged Out | Fibre Channel | A request to a device was failed because the device thinks it was not logged into. FCI treats it like a SCSI Selection Timeout. The High Level Drivers 502 retry turns into a FC-3 Port Login prior to re-issuing the request. | YES |
| IOB Timeout | FCI | A I/O that was issued has not completed within a specified amount of time. | YES |
| Loop Failure | Fibre Channel | This is due to a premature completion of an I/O due to a AL Loop Failure. This could happen if a device is hot-plugged onto a loop when frames are being sent on the loop. The FCI LLD handles this through a multiple stage recovery. 1) Delayed Retry 2) Reset Host Adapter 3) Take Loop Offline | YES |
| Controller Failure | AHIM | This occurs when the HIM detects an adapter hardware problem. The FCI LLD handles this through a multiple stage recovery. 1) Reset Host Adapter 2) Take Loop Offline | YES |
| Port Login Failed | FC-3 | An attempt to login to a device failed. Handled like a SCSI Selection Timeout. | NO |
| Process Login Failed | FC-3/FC-4 | An attempt to do a process login to a FCP device failed. Handled like a SCSI Selection Timeout. | NO |

(iii) Insufficient Resources

The FCI low level driver 506 manages resource pools for IOBs and vector tables. Since the size of these pools will be tuned to the ION 212 configuration, it should not be possible to run out of these resources, simple recovery procedures are implemented.

If a request for an IOB or vector table is made, and there are not enough resources to fulfill the request, the I/O is placed back onto the queue and a timer is set to restart the I/O. Insufficient resource occurrences are logged.

(b) Start Of Day Handling

Upon the start of day, the High Level Driver 502 makes a call to each supported low level driver (including the FCI low level driver 506). The FCI's low level driver 506 start of day handling begins with a call to the FCIhw_init( ) routine, which performs the following operations.

First, a HIM_FindController( ) function is called for specific PCI Bus and Device. This calls a version of FindController( ). The JBOD and SCSI Configuration Module 516 specifies the PCI Bus and Devices to be searched. Next, if an adapter (such as that which is available from ADAPTEC) is found, a HCB is allocated and initialized for the adapter. Then, HIM_GetConfiguration( ) is called to get the adapter-specific resources like scratch memory, memory-mapped I/O, and DMA channels. Next, resources are allocated and initialized, and HIM_Initialize( ) is called to initialize the ADAPTEC HIM and hardware. Finally, IOB and vector tables are allocated and initialized.

(c) Failover Handling

The two halves of the ION 212 dipole are attached to a common set of disk devices. At any given time both IONs 212 must be able to access all devices. From the viewpoint of the FCI low level driver 506, there is no special handling for failovers.

(5) Hardware Interface Module (HIM)

The Hardware Interface Module (HIM) 508 is designed to interface with ADAPTEC's SlimHIM 509. The HIM module 508 has the primary responsibility for translating requests from the FCI low level driver 506 to a request that the SlimHIM 509 can understand and issue to the hardware. This involves taking I/O Block (IOB) requests and translating them to corresponding Transfer Control Block (TCB) requests that are understood by the SlimHIM 509.

The basic functions of the HIM 508 include: (1) defining a low level application program interface (API) to hardware specific functions which Find, Configure, Initialize, and Send I/Os to the adapter, (2) interfacing with the FCI low level driver 506 to translate I/O Block's (IOB's) to TCB requests that the SlimHIM/hardware can understand (e.g. FC primitive TCBs, FC Extended Link Services (ELS) TCBs, and SCSI-FCP operation TCBs); (3) tracking the delivery and completion of commands (TCBs) issued to the Slim-HIM; (4) interpreting interrupt and event information from the SlimHIM 509 and initiates the appropriate interrupt handling and/or error recovery in conjunction with the FCI low level driver 506. The data structure of the TCB is presented in Table VI, below.

TABLE VI

Key HIM Structures

| Structure Name | Memory Type | Description |
| --- | --- | --- |
| TCB | Private | Task Control Block. An AIC-1160 specific structure to describe a Fibre Channel I/O. All requests to the AIC-1160 (LIP, Logins, FCP commands, etc) are issued through a TCB. |

(a) Start Of Day Handling

The HIM 508 defines three entry points used during Start Of Day. The first entry point is the HIM_FindAdapter, which is called by FCIhw_init( ), and uses PCI BIOS routines to determine if an adapter resides on the given PCI bus and device. The PCI vendor and product ID for the adapter is used to determine if the adapter is present.

The second entry point is the HIM_GetConfiguration, which is called by FCIhw_init( ) if an adapter is present, and places resource requirements into provided HCB. For the ADAPTEC adapter, these resources include IRQ, scratch, and TCB memory. This information is found by making calls to the SlinHIM 509.

The third entry point is the HIM_Initialize, which is called by FCIhw_init( ) after resources have been allocated and initialized, initializes TCB memory pool calls SlimHIM to initialize scratch memory, TCBs, and hardware.

(b) Failover Handling

The two halves of the ION dipole 226 are attached to a common set of disk devices. At any given time, both IONs 212, 214 must be able to access all devices. From the viewpoint of the HIM 509, there is no special handling for failovers.

(6) AIC-1160 SlimHIM

The SlimHIM 509 module has the overall objective of providing hardware abstraction of the adapter (in the illustrated embodiment, the ADAPTEC AIC-1160). The Slim-HIM 509 has the primary role of transporting fibre channel requests to the AIC-1160 adapter, servicing interrupts, and reporting status back to the HIM module through the Slim-HIM 509 interface.

The SlimHIM 509 also assumes control of and initializes the AIC-1160 hardware, loads the firmware, starts run time operations, and takes control of the AIC-1160 hardware in the event of an AIC-1160 error.

2. External Interfaces and Protocols

All requests of the ION Physical disk driver subsystem 500 are made through the Common high level driver 502.

a) Initialization (cs_init)

A single call into the subsystem performs all initialization required to prepare a device for I/Os. During the subsystem initialization, all driver structures are allocated and initialized as well as any device or adapter hardware.

b) Open/Close (cs_open/cs_close)

The Open/Close interface 510 initializes and breaks down structures required to access a device. The interface 510 is unlike typical open/close routines because all "opens" and "closes" are implicitly layered. Consequently, every "open" received by the I/O physical interface driver 500 must be accompanied by a received and associated "close," and device-related structures are not freed until all "opens" have been "closed." The open/close interfaces 510 are synchronous in that the returning of the "open" or "close" indicates the completion of the request.

c) Buf_t (cs_strategy)

The Buf_t interface 512 allows issuing logical block read and write requests to devices. The requester passes down a Buf_t structure that describes the I/O. Attributes like device ID, logical block address, data addresses, I/O type (read/write), and callback routines are described by the Buf_t. Upon completion of the request, a function as specified by the callback by the requester is called. The Buf_t interface 512 is an asynchronous interface. The returning of the function back to the requester does not indicate the request has been completed. When the function returns, the I/O may or may not be executing on the device. The request may be on a queue waiting to be executed. The request is not completed until the callback function is called.

d) SCSILib

SCSILib 514 provides an interface to allow SCSI command descriptor blocks (CDBs) other than normal reads and writes to be sent to devices. Through this interface, requests like Start and Stop Unit will be used to spin and spin down disks, and Send and Receive Diagnostics will be used to monitor and control enclosure devices. All SCSILib routines are synchronous. The returning of the called function indicates the completion of the request.

e) Interrupts (cs_intr)

The ION physical disk driver 500 is the central dispatcher for all SCSI and Fibre Channel adapter interrupts. In one embodiment, a Front-End/Back-End interrupt scheme is utilized. In such cases, when an interrupt is serviced, a Front-End Interrupt Service Routine is called. The Front-End executes from the interrupt stack and is responsible for clearing the source of the interrupt, disabling the adapter from generating further interrupts and scheduling a Back-End Interrupt Service Routine. The Back-End executes as a high-priority task that actually handles the interrupt (along with any other interrupts that might have occurred between the disabling of adapter interrupts and the stark of the Back-End task). Before exiting the Back-End, interrupts are re-enabled on the adapter.

3. ION Functions

IONs 212 perform five primary functions. These functions include:

Storage naming and projection: Coordinates with the compute nodes 200 to provide a uniform and consistent naming of storage, by projecting images of storage resource objects stored on the storage disks 224 to the compute nodes 200;

Disk management: implements data distribution and data redundancy techniques with the storage disk drives 224 operatively coupled to the ION 212;

Storage management: for handling storage set up, data movement, including processing of I/O requests from the compute nodes 200; performance instrumentation, and event distribution.

Cache management: for read and write data caching, including cache fill operations such as application hint pre-fetch.

Interconnect management: to control the flow of data to and from the compute nodes 200 to optimize performance and also controls the routing of requests and therefore controls the distribution of storage between the two IONs 212 in a dipole 226.

a) Storage Naming and Projection

IONs 212 project images of storage resource objects stored on the storage disks 224 to the compute nodes 200. An important part of this function is the creation and allocation of globally unique names, fabric unique IDs or volume set identifiers (VSIs) 602 for each storage resource (including virtual fabric disks) managed by the ION 212.

FIG. 6 is a diagram showing the structure and content of the VSI 602 and associated data. Since it is important that the VSIs 602 be unique and non-conflicting, each ION 212 is responsible for creating and allocating globally unique names for the storage resources managed locally by that ION 212, and only that ION 212 managing the storage resource storing the storage resource object is permitted to allocate a VSI 602 for that storage resource. Although only the ION 212 currently managing the resident storage resource can create and allocate a VSI 602, other IONs 212 may thereafter manage storage and retrieval of those storage resources. That is because the VSI 602 for a particular data object does not have to change if an ION-assigned VSI 602 is later moved to a storage resource managed by another ION.

The VSI 602 is implemented as a 64-bit number that contains two parts: an ION identifier 604, and a sequence number 506. The ION identifier 604 is a globally unique identification number that is assigned to each ION 212. One technique of obtaining a globally unique ION identifier 604 is to use the electronically readable motherboard serial number that is often stored in the real time clock chip. This serial number is unique, since it is assigned to only one motherboard. Since the ION identifier 604 is a globally unique number, each ION 212 can allocate a sequence number 606 that is only locally unique, and still create a globally unique VSI 602.

After the VSI 602 is bound to a storage resource on the ION 212, the ION 212 exports the VSI 602 through a broadcast message to all nodes on the fabric to enable access to the storage resource 104. This process is further discussed in the ION name export section herein.

Using the exported VSI 602, the compute node 200 software then creates a local entry point for that storage resource that is semantically transparent in that it is indistinguishable from any other locally attached storage device. For example, if the compute node operating system 202 were UNIX, both block device and raw device entry points are created in the device directory similar to a locally attached device such as peripherals 108 or disks 210. For other operating systems 202, similar semantic equivalencies are followed. Among compute nodes 200 running different operating systems 202, root name consistency is maintained to best support the heterogeneous computing environment. Local entry points in the compute nodes 200 are dynamically updated by the ION 212 to track the current availability of the exported storage resources 104. The VSI 602 is used by an OS dependent algorithm running on the compute node 200 to create device entry point names for imported storage resources. This approach guarantees name consistency among the nodes that share a common operating system. This allows the system to maintain root name consistency to support a heterogeneous computing environment by dynamically (instead of statically) creating local entry points for globally named storage resources on each compute node 200.

As discussed above, the details of creating the VSI 602 for the storage resource 104 are directly controlled by the ION 212 that is exporting the storage resource 104. To account for potential operating system 104 differences among the compute nodes 200, one or more descriptive headers is associated with each VSI 602 and is stored with the VSI 602 on the ION 212. Each VSI 602 descriptor 608 includes an operating system (OS) dependent data section 610 for storing sufficient OS 202 dependent data necessary for the consistent (both the name and the operational semantics are the same across the compute nodes 200) creation of device entry points on the compute nodes 200 for that particular VSI 602. This OS dependent data 610 includes, for example, data describing local access rights 612, and ownership information 614. After a VSI 602 is established by the ION 212, imported by the compute node 200, but before the entry point for that storage resource 104 associated with the VSI 602 can be created, the appropriate OS specific data 610 is sent to the compute node 200 by the ION 212. The multiple descriptive headers per VSI 602 enable both concurrent support of multiple compute nodes 200 running different OSs (each OS has its own descriptor header) and support of disjoint access rights among different groups of compute nodes 200. Compute nodes 200 that share the same descriptor header share a common and consistent creation of device entry points. Thus, both the name and the operational semantics can be kept consistent on all compute nodes 200 that share a common set of access rights.

The VSI descriptor 608 also comprises an alias field 616, which can be used to present a human-readable VSI 602 name on the compute nodes 200. For example, if the alias for VSI 1984 is "soma," then the compute node 200 will have the directory entries for both 1984 and "soma." Since the VSI descriptor 608 is stored with the VSI 602 on the ION 212, the same alias and local access rights will appear on each compute node 200 that imports the VSI 602.

As described above, the present invention uses a naming approach suitable for a distributed allocation scheme. In this approach, names are generated locally following an algorithm that guarantees global uniqueness. While variations of this could follow a locally centralized approach, where a central name server exists for each system, availability and robustness requirements weigh heavily towards a pure distributed approach. Using the foregoing, the present invention is able to create a locally executed algorithm that guarantees global uniqueness.

The creation of a global consistent storage system requires more support than simply preserving name consistency across the compute nodes 200. Hand in hand with names are the issues of security, which take two forms in the present invention. First is the security of the interface between the IONs 212 and the compute nodes 200; second is the security of storage from within the compute node 200.

b) Storage Authentication and Authorization

A VSI 602 resource is protected with two distinct mechanisms, authentication, and authorization. If a compute node 200 is authenticated by the ION 212, then the VSI name is exported to the compute node 200. An exported VSI 602 appears as a device name on the compute node 200. Application threads running on a compute node 200 can attempt to perform operations on this device name. The access rights of the device entry point and the OS semantics of the compute nodes 200 determines if an application thread is authorized to perform any given authorization.

This approach to authorization extends compute node 200 authorization to storage resources 104 located anywhere accessible by the interconnect fabric 106. However, the present invention differs from other computer architectures in that storage resources 104 in the present invention are not directly managed by the compute nodes 200. This difference makes it impractical to simply bind local authorization data to file system entities. Instead, the present invention binds compute node 200 authorization policy data with the VSI 602 at the ION 212, and uses a two stage approach in which the compute node 200 and the ION 212 share a level of mutual trust. An ION 212 authorizes each compute node 200 access to a specific VSI 602, but further refinement of the authorization of a specific application thread to the data designated by the VSI is the responsibility of the compute node 200. Compute nodes 200 then enforce the authorization policy for storage entities 104 by using the policies contained in the authorization metadata stored by the ION 212. Hence, the compute nodes 200 are required to trust the ION 212 to preserve the metadata and requires the ION 212 to trust the compute node 200 to enforce the authorization. One advantage of this approach is that it does not require the ION 212 to have knowledge regarding how to interpret the metadata. Therefore, the ION 212 is isolated from enforcing specific authorization semantics imposed by the different authorization semantics imposed by the different operation systems 202 used by the compute nodes 200.

All data associated with a VSI 602 (including access rights) are stored on the ION 212, but the burden of managing the contents of the access rights data is placed on the compute nodes 200. More specifically, when the list of VSIs 602 being exported by an ION 212 are sent to a compute node 200, associated with each VSI 602 is all of the OS specific data required by the compute node 200 to enforce local authorization. For example, a compute node 200 running UNIX would be sent the name, the group name, the user ID, and the mode bits; sufficient data to make a device entry node in a file system. Alternative names for a VSI 602 specific for that class of compute node operating systems 202 (or specific to just that compute node 200 ) are included with each VSI 602. Local OS specific commands that alter access rights of a storage device are captured by the compute node 200 software and converted into a message sent to the ION 212. This message updates VSI access right data specific to the OS version. When this change has been completed, the ION 212 transmits the update to all compute nodes 200 using that OS in the system.

When a compute node (CN) 200 comes on line, it transmits an "I'm here" message to each ION 212. This message includes a digital signature that identifies the compute node 200. If the compute node 200 is known by the ION 212 (the ION 212 authenticates the compute node 200), the ION 212 exports every VSI name that the compute node 200 has access rights to. The compute node 200 uses these lists of VSI 602 names to build the local access entry points for system storage. When an application 204 running in the compute node 200 first references the local endpoint, the compute node 200 makes a request to the ION 212 by transmitting a message across the interconnect fabric 106 for the access rights description data for that VSI 602. The request message includes a digital signature for the requesting compute node 200. The ION 212 receives the message, uses the digital signature to locate the appropriate set of VSI access rights to be sent in response, and transmits that data to the requesting compute node 200 via the interconnect fabric 106. The ION 212 does not interpret the access rights sent to the compute node 200, however, it simply sends the data. The compute node 200 software uses this data to bind the appropriate set of local access rights to the local entry point for this subject storage object.

A set of compute nodes 200 can share the same set of access rights by either using the same digital signature, or having the ION 212 bind multiple different signatures to the same set of access rights. The present invention uses authentication both to identify the compute node 200 and to specify which set of local authorization data will be used to create the local entry point. Authorization data is only pulled to the compute node when the VSI 602 is first referenced by an application. This "pull when needed" model avoids the startup cost of moving large quantities of access rights metadata on very large systems.

If a compute node 200 fails authentication, the ION 212 sends back a message with no VSI 602 names and an authentication failed flag is set. The compute node 200 can silently continue with no VSI device names from that ION 212 and may report the failed authentication depending on the system administrator's desires. Of course, even a successful authentication may result in no transmission of VSI device names to the compute node.

c) Start Up Deconflicting

When an ION 212 starts up, it attempts to export a VSI 602 to the interconnect fabric 106. In such cases, the data integrity of the system must be preserved from any disruption by the new ION 212. To accomplish this, the new ION 212 is checked before it is allowed to export storage. This is accomplished as follows. First, the ION 212 examines its local storage to create a list of VSIs 602 that it can export. The VSI 602 metadata includes a VSI generation or mutation number. The VSI mutation number is incremented whenever there is a major state change related to that VSI 602 (such as when a VSI is successfully exported to a network). All nodes that take part in VSI conflict detection, including the compute nodes 200 and the IONs 212 maintain in memory a history of VSIs exported and their mutation numbers. All nodes on the interconnect fabric 106 are required to constantly monitor exported VSIs 602 for VSI conflicts. Initially, the VSI mutation number (when the storage extent is first created) is set to zero. The mutation number provides a deconflicting reference in that a VSI 602 exported with a lower mutation number than the previous time it was exported may be assumed to be an impostor VSI even if the ION 212 associated with the real VSI 602 is out of service. An impostor VSI 602 attached to an ION 212 with a higher mutant number than the mutant number associated with the real VSI 602 is considered the real VSI 512 unless I/Os were already performed on the real VSI 602. An ION 212 newly introduced into the interconnect fabric 106 is required to have its mutant number start from 0.

After ION 212 announces that it wishes to join the system, it transmits its list of VSIs 602 and associated mutant numbers. All the other IONs 212 and compute nodes 200 obtain this list, and then check the validity of the ION 212 to export the VSI 602 list.

Other IONs that are currently exporting the same VSI 602 are assumed to be valid, and send the new ION 512 a message that disallows the export of the specific VSI(s) in conflict. If the new ION 512 has a generation or mutation number that is greater than the one in current use in the system, (an event which should not occur in ordinary operation, as VSIs are globally unique) this is noted and reported to the system administrator who take whatever action is necessary. If there are no conflicts, each ION 212 and compute node 200 will respond with a proceed vote. When responses from all IONs 212 and compute nodes 200 have been received, all of the VSIs 602 of the new IONs 212 that are not in conflict have their generation number incremented, and are made available to the system for export.

When a compute node 200 has an application reference and access to a VSI 602, the compute node 200 will track the current generation number locally. Whenever a new ION 212 advertises (attempts to export) a VSI 602, the compute node 200 checks the generation advertised by the VSI 602 against the generation number stored locally for that VSI 602. If the generation numbers agree, the compute node 200 will vote to proceed. If the generation numbers are in conflict (such as would be the case when an older version of the VSI has been brought on line), the compute node 200 will send a disallow message. Compute nodes 200 that have generation numbers older than the generation number advertised by the new ION 212 for that VSI 602 would vote to proceed, and update the local version of the generation number for that VSI 602. Compute nodes 200 do not preserve generation numbers between reboots, because the basic design is that the system across the interconnect fabric 106 is stable and that all newcomers, including compute nodes 200 and IONs 212 are checked for consistency. First power up may create some situations where name space stability for VSIs 602 might be in question. This problem is addressed by powering the IONs 212 first, and allowing them to continue to resolve name conflicts before the compute nodes 200 are allowed to join in. Out of date versions of the VSIs 602 (from old data on disk drives and other degenerative conditions) can then be resolved via the generation number. As long as no compute nodes 200 are using the VSI 602, a newcomer with a higher generation number can be allowed to invalidate the current exporter of a specific VSI 602.

(1) Name Service (a) ION Name Export

An ION 212 exports the Working Set of VSIs 602 that it exclusively owns to enable access to the associated storage. The Working Set of VSIs exported by an ION 212 is dynamically determined through VSI ownership negotiation with the Buddy ION (the other ION 212 in the dipole 226, denoted as 214) and should be globally unique within all nodes communicating with the interconnect fabric 106. The set is typically the default or PRIMARY set of VSIs 602 assigned to the ION 212. VSI Migration for Dynamic Load Balancing and exception conditions that include buddy ION 214 failure and I/O path failure may result in the exported VSI 602 set to be different than the PRIMARY set.

The Working Set of VSIs is exported by the ION 212 via a broadcast message whenever the Working Set changes to provide compute nodes 200 with the latest VSI 602 configuration. A compute node 200 may also interrogate an ION 212 for its working set of VSIs 602. I/O access to the VSIs 602 can be initiated by the compute nodes 200 once the ION 212 enters or reenters the online state for the exported VSIs 602. As previously described, an ION 212 may not be permitted to enter the online state if there are any conflicts in the exported VSIs 602. The VSIs 602 associated with a chunk of storage should be all unique but there is a chance that conflicts may arise (for example, if the VSI were constructed from a unique ID associated with the ION 212 hardware and an ION 212 managed sequence number, and the ION 212 hardware were physically moved) where multiple chunks of storage may have the same VSI.

Once the Working Set has been exported, the exporting ION 212 sets a Conflict Check Timer (2 seconds) before entering the online state to enable I/O access to the exported VSIs 602. The Conflict Check Timer attempts to give sufficient time for the importers to do the conflict check processing and to notify the exporter of conflicts but this cannot be guaranteed unless the timer is set to a very large value. Therefore, an ION 212 needs explicit approval from all nodes (compute nodes 200 and IONs 212) to officially go online. The online broadcast message is synchronously responded to by all nodes and the result is merged and broadcasted back out. An ION 212 officially enters the online state if the merged response is an ACK. If the ION 212 is not allowed to go online, the newly exported set of VSIs 602 cannot be accessed. The Node(s) that sent the NAK also subsequently send a VSI conflict message to the exporter to resolve the conflict. Once the conflict is resolved, the ION 212 exports its adjusted Working Set and attempts to go online once again.

(b) CN Name Import

The compute nodes 200 are responsible to take actions to import all VSIs 504 exported by all IONs 212. During Start of Day Processing, a compute node 200 requests from all online IONs 212 for VSIs 602 that were previously exported so that it can get an up to date view of the name space. From that point on, a compute node 200 listens for VSI 602 exports.

Control information associated with a VSI 602 is contained in a vsnode that is maintained by the ION 212. The compute node 200 portion of the vsnode contains information used for the construction and management of the Names presented to applications 204. The vsnode information includes user access rights and Name Aliases.

(i) Name Domain and Aliases

VSIs 602 may be configured to have an application defined Name Alias that provides an alternate name to access the associated storage. The Name Aliases can be attached to a Virtual Storage Domain to logically group a set of Names. Name Aliases must be unique within a Virtual Storage Domain.

(ii) VSNODE

Modifications to the vsnode by a compute node 200 is sent to the owning ION 212 for immediate update and processing. The vsnode changes are then propagated by the ION 212 to all nodes by exporting the changes and reentering the online state.

d) Storage Disk Management

The JBOD enclosure 222 is responsible for providing the physical environment for the disk devices as well as providing several services to disk devices and enclosure management applications. Some of these services include (1) notification of component failures (power supply, fan, etc.); (2) notification of thresholds (temperature and voltage); (3) enabling and disabling of fault and status lights; (4) enabling and disabling of audible alarms; (5) setting device ID's for disk devices.

In the past, management applications typically interfaced with enclosures through an out-of-band connection. A serial or Ethernet attachment to the remote enclosure along with using protocols like the simple network management protocol (SNMP) allowed receiving status information concerning an enclosure's health. In the present invention, disk enclosures may be physically distant from the host system, so it is not practical to monitor the enclosure configuration and status via a direct connect, such as a separate serial path. In order to avoid extra cabling, the present invention uses an in-band connection which provides for monitoring the enclosure status and controlling the enclosure configuration over the normal existing fibre channel loop.

The in-band connection uses a set of SCSI commands originating from the host that are sent to a SCSI device for querying and controlling the configuration status, and a mechanism for a device to communicate this information with the enclosure itself. The portion of the protocol between the host and the disk drives is detailed in the SCSI-3 Enclosure Services (SES) specification, which is hereby incorporated by reference herein.

Three SCSI commands are used for implementing the SES interface: INQUIRY, SEND DIAGNOSTIC and RECEIVE DIAGNOSTIC RESULTS. The INQUIRY command specifies if the specific device is either an enclosures services device or a device that can transport SES commands to an enclosure service process. The SEND DIAGNOSTICS and RECEIVE DIAGNOSTICS RESULTS are used to control and receive status information from enclosure elements respectively.

When using the SEND DIAGNOSTICS or RECEIVE DIAGNOSTICS RESULTS commands, a page code must be specified. The page code specifies what type of status or information is being requested. The full set of defined SES pages that can be requested via the SEND DIAGNOSTICS and RECEIVE DIAGNOSTICS RESULT command is detailed in Table VII below. Bolded items are required by the SES Event Monitor.

TABLE VII

| Page Code | SEND DIAGNOSTIC | RECEIVE DIAGNOSTIC RESULTS |
|---|---|---|
| 0h | N/A | Supported Diagnostics |
| 1h | N/A | Configuration |
| 2h | Enclosure Count | Enclosure Status |
| 3h | N/A | ES Help Text |
| 4h | ES String Out | ES String In |
| 5h | ES Threshold Out | ES Threshold In |
| 6h | ES Array Control | ES Array Status |
| 7h | N/A | Element Descriptor |
| 8h-3Fh | Reserved (applies to all device types) | Reserved (applies to all device types) |
| 40h-7fh | Specific device type | Specific device type |
| 80h-FFh | Vendor specific pages | Vendor specific pages |

Figure 7:
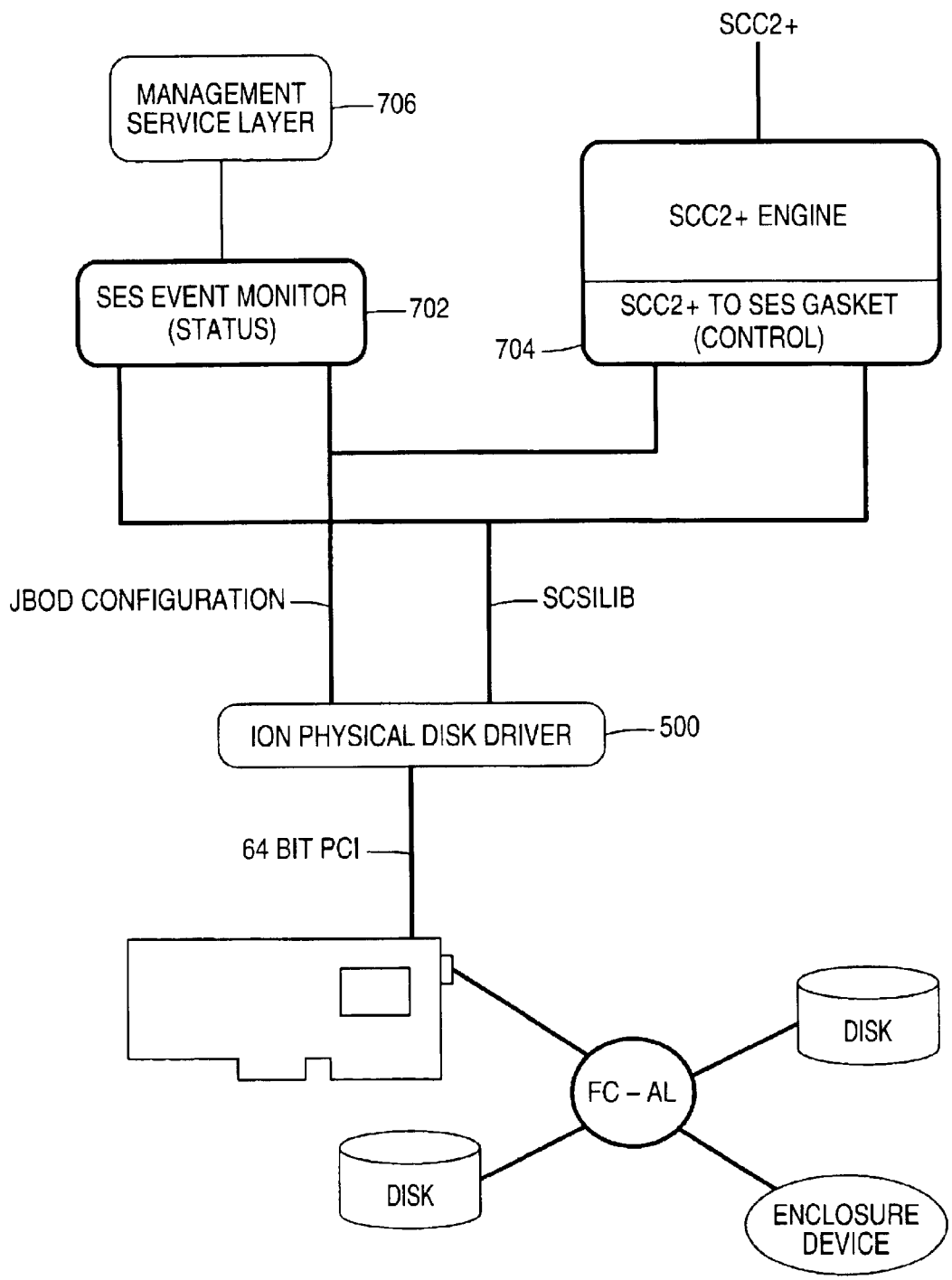
FIG. 7 is a functional block diagram showing the relationships between the ION Enclosure Management modules and the ION physical disk driver.

The application client may periodically poll the enclosure by executing a READ DIAGNOSTICS RESULTS command requesting an enclosure status page with a minimum allocation length greater than 1. The information returned in the 1 byte includes 5 bits that summarize the status of the enclosure. If one of these bits is set, the application client can reissue the command with a greater allocation length to obtain the complete status.

e) ION Enclosure Management FIG. 7 shows the relationships between the ION Enclosure Management modules and the ION physical disk driver Architecture 500. Two components make up this subsystem– the SES Event Monitor 702 and SCC2+ to SES Gasket 704. The SES Event Monitor 702 is responsible for monitoring all attached enclosure service processes and in the event of a status change reporting it via an Event Logging Subsystem. This report can be forwarded to a management service layer 706 if necessary. The SCC2+ to SES Gasket component 704 is responsible for translating SCC2+ commands coming from configuration and maintenance applications and translating them into one or more SES commands to the enclosure service process. This removes the need for the application client to know the specifics of the JBOD configuration.

(1) SES Event Monitor

The SES Event Monitor 702 reports enclosure 222 service process status changes back to the Management Service Layer 706. Status information gets reported via an Event Logging Subsystem. The SES Event Monitor 702 periodically polls each enclosure process by executing a READ DIAGNOSTICS RESULTS command requesting the enclosure status page. The READ DIAGNOSTICS RESULTS command will be sent via the SCSILib interface 514 as provided by the ION physical device disk driver 500. Statuses that may be reported include status items listed in Table VIII below.

TABLE VIII

Enclosure Status Values

| Element | Status | Description |
|---|---|---|
| All | OK | Element is installed and no error conditions are known. |
|  | Not Installed | Element is not installed in enclosure. |
|  | Critical | Critical Condition is detected. |
| Disk | Fault Sensed | The enclosure or disk has detected a fault condition |
| Power Supply | DC Overvoltage | An overvoltage condition has been detected at the power supply output. |
|  | DC Undervoltage | An undervoltage condition has been detected at the power supply output. |
|  | Power Supply | A failure condition has been detected. |

TABLE VIII-continued

Enclosure Status Values

| Element | Status | Description |
|---|---|---|
| | Fail | |
| | Temp Warn | An over temperature has been detected. |
| | Off | The power supply is not providing power. |
| Cooling | Fan Fail | A failure condition has been detected. |
| | Off | Fan is not providing cooling. |

When the SES Event Monitor 702 starts, it reads in the status for each element 402–424 contained in the enclosure. This status is the Current Status. When a status change is detected, each status that changed from the Current Status is reported back to the Management Service Layer 706. This new status is now the Current Status. For example, if the current status for a fan element is OK and a status change now reports the element as Fan Fail, an event will be reported that specifies a fan failure. If another status change now specifies that the element is Not Installed, another event will be reported that specifies the fan has been removed from the enclosure. If another status change specifies that the fan element is OK, another event will be generated that specifies that a fan has been hot-plugged and is working properly.

(a) Start Of Day Handling

The SES Event Monitor 702 is started after the successful initialization of the ION physical disk driver 500 After starting, the SES Event Monitor 602, reads the JBOD and SCSI Configuration Module 516 to find the correlation of disk devices and enclosure service devices, and how the devices are addressed. Next, the status of each enclosure status device is read. Then, events are generated for all error conditions and missing elements. After these steps are completed, the status is now the Current Status, and polling begins.

(2) SCC2+ to SES Gasket

SCC2+ is the protocol used by the ION 212 to configure and manage Virtual and Physical devices. The plus '+' in SSC2+ represents the additions to the SSC2 which allow full manageability of the ION 212 devices and components, and to allow consistent mapping of SSC2 defined commands to SES.

The Service Layer 706 addresses JBOD enclosure 222 elements through SSC2 MAINTENANCE IN and MAINTENANCE OUT commands. The following sections describe the service actions which provide the mechanism for configuring, controlling, and reporting status of the components. Each of these commands will be implemented on the ION 212 as a series of SEND DIAGNOSTIC and RECEIVE DIAGNOSTIC RESULTS SCSI commands.

Configuration of components are performed using the following service actions.

ADD COMPONENT DEVICE— The ADD COMPONENT DEVICE command is used to configure component devices into the system, and to define their LUN addresses. The LUN address is assigned by the ION 212 based on the components position in the SES Configuration Page. The REPORT COMPONENT DEVICE service action is performed following this command to obtain the results of the LUN assignments.

REPORT COMPONENT DEVICE— The REPORT COMPONENT DEVICE STATUS service action is a vendor unique command intended to retrieve complete status information about a component device. SES provides four bytes of status for each element type. This new command is required because the REPORT STATES and REPORT COMPONENT DEVICE service actions allocate only one byte for status information, and the defined status codes conflict with those defined by the SES standard.

ATTACH COMPONENT DEVICE— The ATTACH COMPONENT DEVICE requests that one or more logical units be logically attached to the specified component device. This command may be used to form logical associations between volume sets and the component devices upon which they are dependent, such as fans, power supplies, etc.

EXCHANGE COMPONENT DEVICE— The EXCHANGE COMPONENT DEVICE service action requests that one component device be replaced with another.

REMOVE COMPONENT DEVICE— The REMOVE PERIPHERAL DEVICE/COMPONENT DEVICE service actions requests that a peripheral or component device be removed from the system configuration. If a component device which has attached logical units is being removed, the command will be terminated with a CHECK CONDITION. The sense key will be ILLEGAL REQUEST, with an additional sense qualifier of REMOVE OF LOGICAL UNIT FAILED.

Status and other information about a component may be obtained through the following services actions:

REPORT COMPONENT STATUS— The REPORT COMPONENT DEVICE STATUS service action is a vendor unique command intended to retrieve complete status information about a component device. SES provides four bytes of status for each element type. The REPORT STATES and REPORT COMPONENT DEVICE service actions allocate only one byte for status information, and the defined status codes conflict with those defined by the SES standard. Therefore this new command is required.

REPORTSTATES— The REPORT STATES service action requests state information about the selected logical units. A list of one or more states for each logical unit is returned.

REPORT COMPONENT DEVICE— The REPORT COMPONENT DEVICE service action requests information regarding component device(s) within the JBOD. An ordered list of LUN descriptors is returned, reporting the LUN address, component type, and overall status. This command is used as part of the initial configuration process to determine the LUN address assigned by the ADD COMPONENT DEVICE service action.

REPORT COMPONENT DEVICE ATTACHMENTS— The REPORT COMPONENT DEVICE ATTACHMENTS service action requests information regarding logical units which are attached to the specified component device(s). A list of component device descriptors is returned, each containing a list of LUN descriptors. The LUN descriptors specify the type and LUN address for each logical unit attached to the corresponding component.

REPORT COMPONENT DEVICE IDENTIFIER— The REPORT COMPONENT DEVICE IDENTIFIER service action requests the location of the specified component device. An ASCII value indicates the position of the component is returned. This value must have been previously set by the SET COMPONENT DEVICE IDENTIFIER service action.

Management of components is performed through the following:

INSTRUCT COMPONENT DEVICE— The INSTRUCT COMPONENT DEVICE command is used to send control instructions, such as power on or off, to a component device.

The actions that may be applied to a particular device vary according to component type, and are vendor specific.

BREAK COMPONENT DEVICE— The BREAK COMPONENT DEVICE service action places the specified component(s) into the broken (failed) state.

C. Interconnect Fabric

1. Overview

Since it allows more data movement, the fabric attached storage model of the present invention must address I/O performance concerns due to data copies and interrupt processing costs. Data copy, interrupt and flow control issues are addressed in the present invention by a unique combination of methods. Unlike the destination-based addressing model used by most networks, the present invention uses a sender-based addressing model where the sender selects the target buffer on the destination before the data is transmitted over the fabric. In a sender-based model, the destination transmits to the sender a list of destination addresses where messages can be sent before the messages are sent. To send a message, the sender first selects a destination buffer from this list. This is possible because the target side application has already given the addresses for these buffers to the OS for use by the target network hardware, and the network hardware is therefore given enough information to transfer the data via a DMA operation directly into the correct target buffer without a copy.

While beneficial in some respects, there are several issues with sender-based addressing. First, sender-based addressing extends the protection domain across the fabric from the destination to include the sender, creating a general lack of isolation and raising data security and integrity concerns. Pure sender-based addressing releases memory addresses to the sender and requires the destination to trust the sender, a major issue in a high-availability system. For example, consider the case when the destination node has given a list of destination addresses to the sender. Before the sender uses all these addresses, the destination node crashes and then reboots. The send-side now has a set of address buffers that are no longer valid. The destination may be using those addresses for a different purpose. A message sent to anyone of them might have serious consequences as critical data could be destroyed on the destination.

Second, the implementation of sender-based addressing requires cooperation of the network to extract the destination address from the message before it can initiate the DMA of the data, and most network interfaces are not designed to operate this way.

What is needed is an addressing model that embraces the advantages of a sender-based model, but avoids the problems. The present invention solves this problem with a hybrid addressing model using a unique "put it there" (PIT) protocol that uses an interconnect fabric based on the BYNET.

2. BYNET and the BYNET Interface

BYNET has three important attributes which are useful to implement the present invention.

First, BYNET is inherently scaleable— additional connectivity or bandwidth can easily be introduced and is immediately available to all entities in the system. This is in contrast with other, bus-oriented interconnect technologies, which do not add bandwidth as a result of adding connections. When compared to other interconnects, BYNET not only scales in terms of fan-out (the number of ports available in a single fabric) but also has a bisection bandwidth that scales with fan-out.

Second, BYNET can be enhanced by software to be an active message interconnect— under its users' (i.e. compute resources 102 and storage resources 104) directions, it can move data between nodes with minimal disruption to their operations. It uses DMA to move data directly to predetermined memory addresses, avoiding unnecessary interrupts and internal data copying. This basic technique can be expanded to optimize the movement of smaller data blocks by multiplexing them into one larger interconnect message. Each individual data block can be processed using a modification of the DMA-based technique, retaining the node operational efficiency advantages while optimizing interconnect use.

Third, because the BYNET can be configured to provide multiple fabrics, it is possible to provide further interconnect optimization using Traffic Shaping. This is essentially a mechanism provided by the BYNET software to assign certain interconnect channels (fabrics) to certain kinds of traffic, reducing, for example, the interference that random combinations of long and short messages can generate in heavily-used shared channels. Traffic shaping is enabled by BYNET, and may be user-selectable for predictable traffic patterns.

Figure 8:
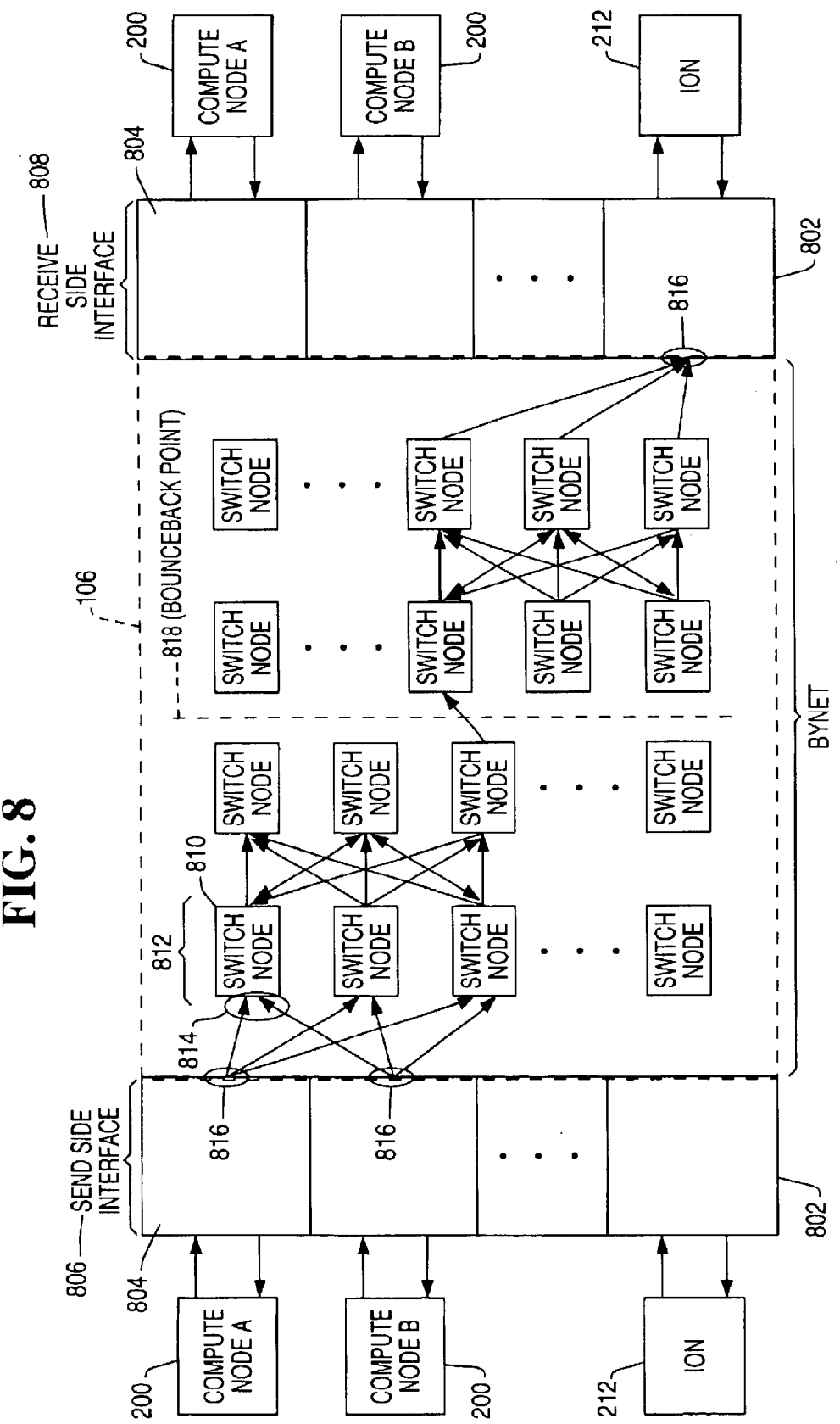
FIG. 8 is a diagram of the BYNET host side interface.

FIG. 8 shows a diagram of the BYNET and its host side interface 802. The BYNET host side interface 802 includes a processor 804 that executes channel programs whenever a circuit is created. Channel programs are executed by this processor 804 at both the send 806 and destination 808 interfaces for each node. The send-side interface 806 hardware executes a channel program created on the down-call that controls the creation of the circuit, the transmission of the data and the eventual shutdown of the circuit. The destination-side interface 808 hardware executes a channel program to deliver the data into the memory at the destination and then complete the circuit.

The BYNET comprises a network for interconnecting the compute nodes 200 and IONs 212, which operate as processors within the network. The BYNET comprises a plurality of switch nodes 810 with input/output ports 814. The switch nodes 810 are arranged into more than $g(\log_b N)$ switch node stages 812, where b is the total number of switch node input/output ports, N is the total number of network input/output ports 816 and wherein g(x) is a ceiling function providing the smallest integer not greater than the argument x. The switch nodes 810 therefore provide a plurality of paths between any network input port 816 and network output port 816 to enhance fault tolerance and lessen contention. The BYNET also comprises a plurality of bounceback points in the bounceback plane 818 along the highest switch node stage of the network, for directing transmission of messages throughout the network. The bounceback points logically differentiate between switch nodes 810 that load balance messages through the network from switch nodes 810 that direct messages to receiving processors.

Processors implemented in nodes such as compute node 200 and ION 212 can be partitioned into one or more superclusters, comprising logically independent predefined subsets of processors. Communications between processors can be point to point, or multicast. In the multicast mode of communications, a single processor can broadcast a message to all of the other processors or to superclusters. Multicast commands within different superclusters can occur simultaneously. The sending processor transmits its multicast command which propagates through the forward channel to all of the processors or the group of processors. Multicast messages are steered a particular bounceback point in a bounceback plane 818 in the network for subsequent routing to the processors in the supercluster. This prevents deadlocking the network because it permits only one multicast message through the particular bounceback point at a time and prevents multicast messages to different superclusters from interfering with one another. The processors that receive multicast messages reply to them by transmitting, for example, their current status through the back channel. The BYNET can function to combine the replies in various ways.

BYNET currently supports two basic types of messages, an in-band message, and an out-of-band message. A BYNET in-band message delivers the message into a kernel buffer (or buffers) at the destinations host's memory, completes the circuit, and posts an up-call interrupt. With a BYNET out-of-band message, the header data in a circuit message causes the interrupt handler in the BYNET driver to create the channel program that is used to process the rest of the circuit data being received. For both types of messages, the success or failure of a channel program is returned to the sender via a small message on the BYNET back channel. This back channel message is processed as part of the circuit shutdown operation by the channel program at the sender. (The back channel is the low bandwidth return path in a BYNET circuit). After the circuit is shutdown, an up-call interrupt is (optionally) posted at the destination to signal the arrival of a new message.

The use of BYNET out-of-band messages is not an optimal configuration, since the send-side waits for the channel program to be first created and then executed. BYNET in-band messages do not allow the sender to target the applications buffer directly and therefore require a data copy. To resolve this problem, the present invention uses the BYNET hardware in a unique way. Instead of having the destination side interface 808 create the channel program that it needs to process the data, the send interface 806 side creates both the send-side and the destination-side channel programs. The send-side channel program transfer, as part of the message, a very small channel program that the destination side will execute. This channel program describes how the destination side is to move the data into the specified destination buffer of the target application thread. Because the sender knows the destination thread where this message is to be delivered, this technique enables the send-side to control both how and where a message is delivered, avoiding most of the trauma of traditional up-call processing on the destination side. This form of BYNET messages is called directed-band messages. Unlike an active message used in the active message, inter-process communication model, (which contains the data and a small message handling routine used to process the message at the destination), the present invention uses BYNET directed-band messages in which the BYNET I/O processor executes the simple channel program, while with active messages the host CPU usually executes the active message handler.

The use of the back channel allows the send-side interface to suppress the traditional interrupt method for signaling message delivery completion. For both out-of-band and directed-band messages, a successftil completion indication at the send-side only indicates that the message has been reliably delivered into the destination's memory.

While this guarantees the reliable movement of a message into the memory space at the destination node, it does not guarantee the processing of the message by the destination application. For example, a destination node could have a functional memory system, but have a failure in the destination application thread that could prevent the message from ever being processed. To handle reliable processing of messages in the present invention, several methods are employed independently to both detect and correct failures in message processing. In terms of the communication protocol for the present invention, timeouts are used at the send-side to detect lost messages. Re-transmission occurs as required and may trigger recovery operations in case software or hardware failures are detected.

Even with directed-band messages, the present invention must allow message delivery to a specific target at the destination, and a mechanism that gives the sender enough data to send a message to the right target application thread buffer. The present invention accomplishes this feat with a ticket-based authentication scheme. A ticket is a data structure that cannot be forged, granting rights to the holder. In essence, tickets are one-time permissions or rights to use certain resources. In the present invention, IONs 212 can control the distribution of service to the compute nodes 200 through ticket distribution. In addition, the tickets specify a specific target, a necessary requirement to implement a sender-based flow control model.

D. The "Put it There" (PIT) Protocol

1. Overview

The PIT protocol is a ticket-based authentication scheme where the ticket and the data payload are transmitted in an active message using the BYNET directed-band message protocol. The PIT protocol is a unique blend of ticket-based authentication, sender-based addressing , debit/credit flow control, zero memory copy, and active messages.

2. PIT Messages

FIG. 9 shows the basic features of a PIT message or packet 901, which contains a PIT header 902 followed by payload data 904. The PIT header 902 comprises a PIT ID 906, which represents an abstraction of the target data buffer, and is a limited life ticket that represents access rights to a pinned buffer of a specified size. Elements that own the PIT ID 906 are those that have the right to use the buffer, and a PIT ID 906 must be relinquished when the PIT buffer is used. When a destination receives a PIT message, the PIT ID 906 in the PIT header specifies the target buffer to the BYNET hardware where the payload is to be moved via a DMA operation.

Flow control under the PIT protocol is a debit/credit model using sender-based addressing. When a PIT message is sent, it represents a flow-control debit to the sender and a flow-control credit to the destination. In other words, if a device sends a PIT ID 906 to a thread, that thread is credited with a PIT buffer in the address space. If the device returns a PIT ID 906 to its sender, the device is either giving up its rights or is freeing the buffer specified by the PIT ID 906. When a device sends a message to a destination buffer abstracted by the PIT ID 906, the device also gives up its rights to the PIT buffer. When a device receives a PIT ID 906, it is a credit for a PIT buffer in the address space of the sender (unless the PIT ID 906 is the device's PIT ID 906 being returned).

At the top of the header 902 is the BYNET channel program 908 (send-side and destination side) that will process the PIT packet 901. Next are two fields for transmitting PIT ID tickets: the credit field 910 and the debit field 912. The debit field 912 contains a PIT ID 906 where the payload data will be transferred by the destination network interface via the channel program. It is called the debit field, because the PIT ID 906 is a debit for the sending application thread (a credit at the destination thread). The credit field 910 is where the sending thread transfers or credits a PIT buffer to the destination thread. The credit field 910 typically holds the PIT ID 906 where the sending thread is expecting to be sent a return message. This usage of the credit PIT is also called a SASE (self-addressed stamped envelope) PIT. The command field 914 describes the operation the target is to perform on the payload data 904 (for example a disk read or write command). The argument fields 916 are data related to the command (for example the disk and block number on the disk to perform the read or write operation). The sequence number 918 is a monotonically increasing integer that is unique for each source and destination node pair. (Each pair of nodes has one sequence number for each direction). The length field 920 specifies the length of PIT payload data 904 in bytes. The flag field 922 contains various flags that modify the processing of the PIT message. One example is the duplicate message flag. This is used in the retransmission of potential lost messages to prevent processing of an event more than once.

When the system first starts up, no node has PIT IDs 906 for any other node. The BYNET software driver prevents the delivery of any directed-band messages until the PIT first open protocol is completed. The distribution of PIT IDs 906 is initiated when an application thread on a compute node 200 does the first open for any virtual disk device located on an ION 212. During the first open, the ION 212 and compute node 200 enter a stage of negotiation where operating parameters are exchanged. Part of the first open protocol is the exchange of PIT IDs 906. PIT IDs 906 can point to more than a single buffer as the interface supports both gather DMA at the sender and scatter DMA at the destination. The application is free to distribute the PIT ID 906 to any application on any other node.

The size and number of PIT buffers to be exchanged between this compute node 200 and ION 212 are tunable values. The exchange of debit and credit PIT IDs 906 (those in debit field 912 and credit field 910) form the foundation of the flow control model for the system. A sender can only send as many messages to the destination as there are credited PIT IDs 906. This bounds the number of messages that a given host can send. It also assures fairness in that each sender can at most only exhaust those PIT IDs 906 that were assigned to it, as each node has its own PIT ID 906 pool.

The ION 212 controls the pool of PIT tickets it has issued to compute nodes 200. The initial allocation of PIT IDs 906 to a compute node 200 occurs during the first open protocol. The number of PIT IDs 906 being distributed is based on an estimate of the number of concurrent active compute nodes 200 using the ION 212 at one time and the memory resources in the ION 212. Since this is just an estimate, the size of the PIT pool can also be adjusted dynamically during operation by the ION 212. This redistribution of PIT resources is necessary to assure fairness in serving requests from multiple compute nodes 200.

PIT reallocation for active compute nodes 200 proceeds as follows. Since active compute nodes 200 are constantly making I/O requests, PIT resources are redistributed to them by controlling the flow of PIT credits in completed I/O messages. Until the proper level is reached, PIT credits are not sent with ION 212 completions (decreasing the PIT pool for that compute node 200 ). A more difficult situation is presented for compute nodes 200 that already have a PIT allocation, but are inactive (and tying up the resources). In such cases, the ION 212 can send a message to invalidate the PIT (or a list of PIT IDs) to each idle compute node 200. If an idle compute node 200 does not respond, the ION 212 may invalidate all the PIT IDs for that node and then redistribute the PIT IDs to other compute nodes 200. When an idle compute node 200 attempts to use a reallocated PIT, the compute node 200 is forced back into the first open protocol.

Increasing the PIT allocation to a compute node 200 is accomplished described below. A PIT allocation message can be used to send newly allocated PIT IDs to any compute node. An alternative technique would be to send more than one PIT credit in each I/O completion message.

3. PIT Protocol In Action— Disk Read and Write

To illustrate the PIT protocol, discussion of a compute node 200 request for a storage disk 224 read operation from an ION 212 is presented. Here, it is assumed that the first open has already occurred and there are sufficient numbers of free PIT buffers on both the compute node 200 and the ION 212. An application thread performs a read system call, passing the address of a buffer where the disk data is to be transferred to the compute node high level SCSI driver (CN system driver). The CN system driver creates a PIT packet that contains this request (including the virtual disk name, block number, and data length). The upper half of the CN system driver then fills in the debit and credit PIT ID fields 910, 912. The debit PIT field 912 is the PIT ID 906 on the destination ION 212 where this read request is being sent. Since this is a read request, the ION 212 needs a way to specify the application's buffer (the one provided as part of the read system call) when it creates the I/O completion packet. Because PIT packets use send-based addressing, the ION 212 can only address the application buffer if it has a PIT ID 906. Since the application buffer is not part of the normal PIT pool, the buffer is pinned into memory and a PIT ID 906 is created for the buffer. Since the read request also requires return status from the disk operation, a scatter buffer for the PIT is created to contain the return status. This SASE PIT is sent in the credit field as part of the read PIT packet. The PIT packet is then placed on the out-going queue. When the BYNET interface 802 sends the PIT packet, it moves it from the send-side via a DMA operation, and then transfers it across the interconnect fabric 106. At the destination-side BYNET interface 808, as the PIT packet arrives it triggers the execution of the PIT channel program by a BYNET channel processor 804. The BYNET channel processor 804 in the host side interface 802 extracts the debit PIT ID 906 to locate the endpoint on the ION 212. The channel-program extracts the buffer address and programs the interface DMA engine to move the payload data directly into the PIT buffer— thus allowing the PIT protocol to provide the zero data copy semantics. The BYNET interface 802 posts an interrupt to the receiving application on the ION 212. No interrupt occurs on the compute node 200. When the back-channel message indicates the transfer failed, then depending on the reason for the failure, the I/O is retried. After several attempts, an ION 212 error state is entered (see the ION 212 recover and fail-over operations described herein for specific details) and the compute node 200 may attempt to have the request handled by a buddy ION 214 in the dipole. If the message was reliably delivered into the destination node memory, the host side then sets up a re-transmission timeout (which is longer than the worst case I/O service times) to ensure the ION 212 successfully processes the message. When this timer expires, the PIT message is resent by the compute node to the ION 212. If the I/O is still in progress, the duplicate request is simply dropped, otherwise the resent request is processed normally. Optionally, the protocol could also require an explicit acknowledge of the resent request to reset the expiration timer and avoid the trauma of a failing the I/O to the application.

Figure 10:
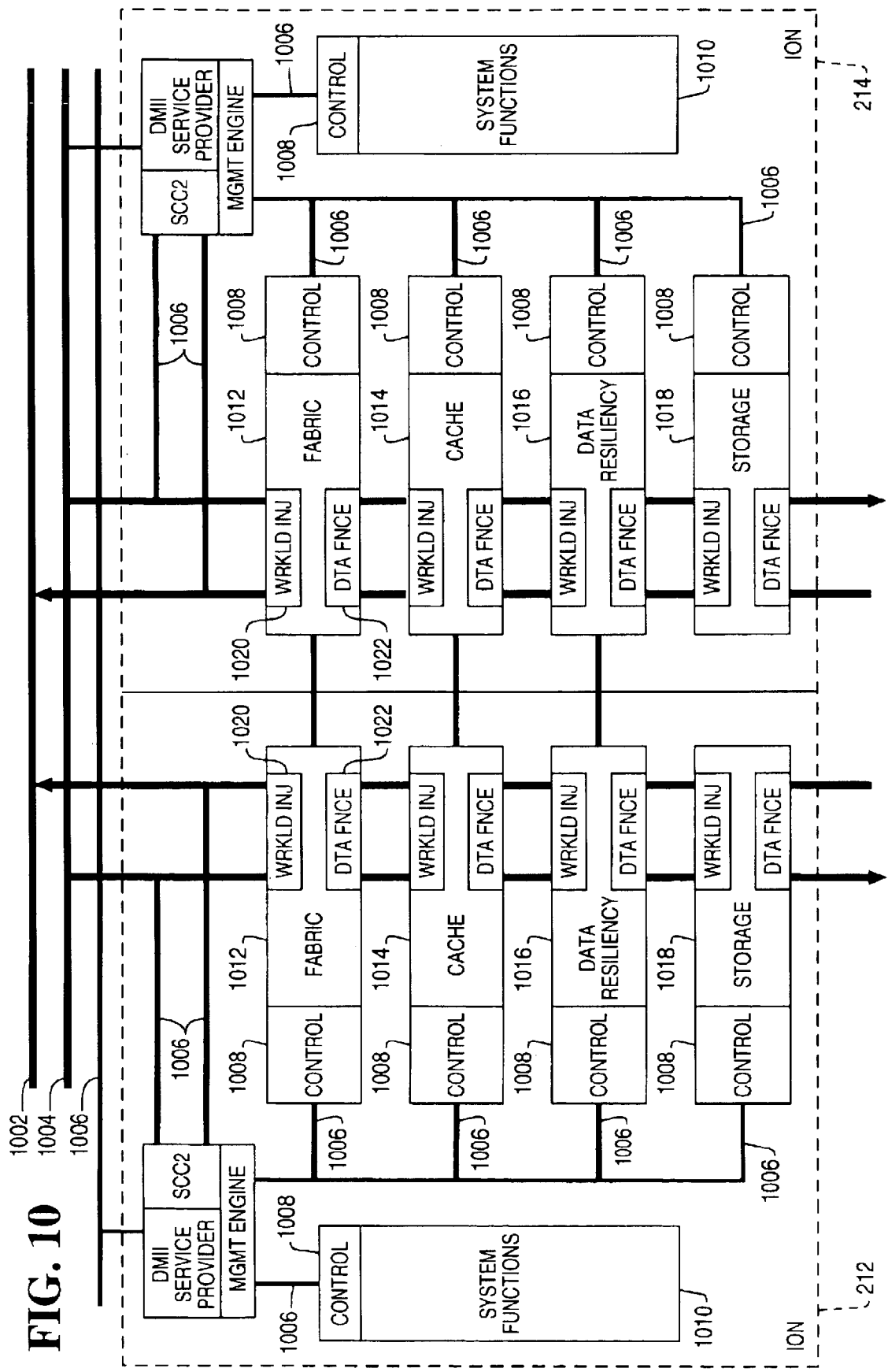
FIG. 10 is a block diagram of the ION 212 functional modules.

FIG. 10 is a block diagram of the ION 212 functional modules. Input to the IONS 212 and 214 are data lines 1002 and 1004, and control lines 1006. Each module in the ION 212 comprises a control module 1008 in communication with control lines 1006. The control modules 1008 accept commands from data lines 1002 and provide module control functions. System function module 1010 implements the ION functions described herein. IONs 212 and 214 comprise a fabric module 1020, a cache module 1014, a data resiliency module 1016, and a storage module 1018. Each of these modules comprises a control module, a workload injector 1020 for inserting and retrieving data from data lines 1002 and 1004, and a data fence 1022 for inhibiting the passage of data.

After a PIT read request is sent to the ION 212, it is transferred to the workload injector of the ION cache module 1014. The workload-injector inserts requests into an ION cache module 1014 which may return the data directly if it was cached or allocates a buffer for the data and pass it on to the ION storage module 1018. The ION storage system module 1018 translates this request into one (or more) physical disk request(s) and sends the disk request(s) to the appropriate disk drive(s) 224. When the disk read operation (s) complete, the disk controller posts an interrupt to signal the completion of the disk read. The ION workload-injector creates an I/O completion PIT packet. The debit PIT ID (stored in debit field 912) is the credit PIT ID (stored in credit field 910) from the SASE PIT in the read request (this is where the application wants the disk data placed). The credit PIT ID is either the same PIT ID the compute node 200 sent this request to, or a replacement PIT ID if that buffer is not free. This credit PIT will give the compute node credit for sending a future request (this current PIT request has just completed so it increases the queue depth for this compute node 200 to this ION 212 by one). There are three reasons why an ION 212 may not return a PIT credit after processing a PIT. The first is that the ION 212 wants to reduce the number of outstanding requests queued from that compute node 200. The second reason is the ION 212 wants to redistribute the PIT credit to another compute node 200. The third reason is there may be multiple requests encapsulated into a single PIT packet (see the Super PIT packets discussion herein). The command field 914 is a read complete message and the argument is the return code from the disk drive read operation. This PIT packet is then queued to the BYNET interface 702 to be sent back to the compute node 200. The BYNET hardware then moves this PIT packet via a DMA to the compute node 200. This triggers the compute node 200 BYNET channel program to extract the debit PIT ID 912 and validate it before starting the DMA into the target PIT buffer (which in this case is the application's pinned buffer). When the DMA is completed, the compute node BYNET hardware triggers an interrupt to signal the application that the disk read has completed. On the ION 212, the BYNET driver returns the buffer to the cache system.

The operations performed for a write request is similar to those performed for the read operation. The application calls the compute node high level driver, passing the address that contains the data, virtual disk name, disk block number, and data length. The compute node high level driver selects a PIT ID 906 on the destination ION 212 and uses this data to create a PIT write request. The SASE PIT will contain only the return status of the write operation from the ION 212. At the ION 212, an interrupt is posted when the PIT packet arrives. This request is processed the same way as a PIT read operation; the write request is passed to the cache routines that will eventually write the data to disk. When the disk write completes (or the data is safely stored in the write cache of both ION nodes 212 and 214), an I/O completion message is sent back to the compute node 200. When the ION 212 is running with write-cache enabled, the other ION 214 in the dipole, rather than the ION 212 to which the request was sent, returns the I/O completion message. This is further described herein with respect to the Bermuda Triangle Protocol.

4. Stale PIT IDs and Fault Recovery Issues

The exchange of PIT IDs during first open is the mechanism through which stale PIT IDs 906 created by either a hardware or software failure are invalidated. Consider the situation where an ION 212 and a compute node 200 have exchanged PIT IDs and suddenly the ION 212 crashes. PIT IDs 906 represent target buffers pinned in memory and unless invalidated, outstanding PIT IDs 906 for either an ION 212 or a compute node 200 that has just rebooted could cause a significant software integrity problem, due to PIT IDs that are no longer valid, or stale. The BYNET hardware and the directed-band message support provide the essential mechanism for invalidating stale PIT IDs 906.

At the end of the first open protocol, each side must give the compute node high level SCSI driver a list of hosts to which PIT IDs 906 are distributed. Stated differently, the host is giving the compute node high level SCSI driver a list of hosts from which it will accept PIT packets. The compute node high level driver then uses this list to create a table that controls the delivery of directed-band messages. This table specifies the combinations of ION 212 pairs that allow directed-band messages to be sent to each other. (The table can also specify one-way PIT message flows.) The compute node high level driver keeps this table internally on the hosts (as data private to the driver) as part of the BYNET configuration process. Hosts can be added or subtracted from this list by the PIT protocol at any time by a simple notification message to the compute node high level driver. When a node fails, shuts down, or fails to respond, the BYNET hardware detects this and will notify all the other nodes on the fabric. The BYNET host driver on each node responds to this notification and deletes all references to that host from the directed-band host table. This action invalidates all PIT IDs 906 that host may have distributed to any other host. This is the key to protecting a node from PIT packets previously distributed. Until the compute node high level driver on that host has been reconfigured, the BYNET will fail all messages that are sent to that host. Even after first reconfiguration, until it is told by the local PIT protocol, the BYNET will not allow any directed-band message to be sent to this newly restarted or reconfigured host. This protects against the delivery of any stale PIT packets until the PIT protocol has been properly initialized through the first open protocol.

When a host attempts to send a directed-based message to an invalid host (using a now invalidated PIT ID 906), the send-side compute node high level driver refuses the message with an error condition to the sender. This rejection will trigger the first open handshaking to be invoked between the two nodes. After the first open handshaking completes, any I/O operations for the ION 212 that are still pending (from the perspective of the compute node 200) will have to be resent. However, unless this was a warm re-start, it is likely that the ION 212 was down for a long time, so any pending I/O operations would have been restarted as part of fail-over processing and sent to the other ION 212 in the dipole. (See the sections on ION fault handling for more details). If the crashed node had been a compute node 200, the unexpected arrival of a first open request at the ION 212 for a compute node 200 that had already gone through a first open will trigger PIT ID recovery operations. The ION 212 will invalidate all PIT IDs 906 credited to the compute node 200 (or in reality will probably just re-issue the old ones). Any pending I/O operation for that compute node 200 are allowed to complete (though this is an unlikely event unless the time for a node restart is extremely quick). Completion messages will be have to be dropped as the SASE PIT it is using would be stale (and the application thread that issued the I/O request would no longer exist).

5. Super PIT (SPIT)— Improving Small I/O Performance

The PIT protocol has an advantage over normal SCSI commands. Because the core of the present invention is a communication network, not a storage network, the system can use network protocols to improve performance over what a storage model would allow. Processing overhead of handling up-calls represents a performance wall for workloads dominated by small I/O requests. There are several approaches to improving small I/O performance. One approach is to improve the path length of the interrupt handling code. The second is to collapse the vectoring of multiple interrupts into a single invocation of the interrupt handler using techniques similar to those employed in device drivers. The third is to reduce the number of individual I/O operations and cluster (or convoy) them into a single request. Nodes which have to repackage incoming and outgoing data flows due to different MTU sizes on the source and destination physical links tend to collect data. This problem is also worsened by speed mismatches between the sending and destination networks (especially where the destination network is slower). These nodes are constantly subjected to flow control from the destination. The result is traffic that flows out of the router in bursts. This is called data convoying.

The present invention takes advantage of data convoys as a technique for reducing the number of up-call generated interrupts in both the ION 212 and the compute node 200. By way of illustration, consider the data flow from an ION 212 to a compute node 200. In the debit/credit model for flow control used by the present invention, I/O requests queue at both the compute node 200 and the ION 212. Queuing starts with PIT packets stored in the ION 212 and when that is exhausted, queuing continues back at the compute node 200. This is called an overflow condition. Usually, overflow occurs when a node has more requests than it has PIT buffer credits. Each time an I/O completes, the ION 212 sends a completion message back to the compute node 200. Usually, this completion message includes a credit for the PIT buffer resource just released. This is the basis of the debit/credit flow control. When the system is swamped with I/O requests, each I/O completion is immediately replaced with a new I/O request at the ION 212. Therefore, under periods of heavy load, I/O requests flow one at a time to the ION 212, and queue in the ION 212 for an unspecified period. Each of these requests creates an up-call interrupt, increasing the load on the ION 212.

This dual queue model has a number of advantages. The number of PIT buffers allocated to a compute node 212 is a careful tradeoff. There should be sufficient workload queued locally to the ION 212 so that when requests complete, new work can be rapidly dispatched. However, memory resources consumed by queued requests on the ION 212 may be better utilized if assigned to a cache system. When PIT queues on the ION 212 are kept short to conserve memory, performance may suffer if the ION 212 goes idle and has to wait for work to be sent from the compute nodes 200.

Super-PIT is an aspect of the PIT protocol designed to take advantage of the flow control of a debit/credit system at high loads in order to reduce the number of up-call interrupts. Super-PIT improves the performance of OLTP and similar workloads dominated by high rates of relatively small I/Os. Instead of sending requests one at a time, a super-PIT packet is a collection of I/O requests all delivered in a single, larger super-PIT request. Each super-PIT packet is transported the same way as a regular PIT buffer. Individual I/O requests contained within the super-PIT packet are then extracted and inserted into the normal ION 212 queuing mechanism by the PIT workload injector when ION 212 resources become available. These individual I/O requests can be either read or write requests.

The PIT workload-injector acts as local proxy (on the ION 212) for application request transported to the ION 212. The PIT workload-injector is also used by the RT-PIT and FRAG-PIT protocols discussed in a later section. When the super-PIT is exhausted of individual requests, the resource is freed to the compute node and another super-PIT packet can be sent to replace it. The number of super-PIT packets allowed per host will be determined at first open negotiation. Obviously the amount of work queued on the ION 212 has to be sufficient to keep the ION 212 busy until another super-PIT packet can be delivered.

Consider the situation when a compute node 200 has queued up enough work in an ION 212 to exhaust its PIT credit and has begun to queue up requests locally. The number of requests queued in the super-PIT request is bounded only by the size of the buffer to which the super-PIT is transported. Super-PIT packets operate differently from normal PIT packets. In the present invention's control model, devices can only send a request (a debit), if you have a credit for the destination. The particular PIT packet used by the device is of no particular concern, as the device is not targeting a specific application thread within the ION 212. PIT packets to the ION 212 just regulate buffer utilization (and flow control as a side effect). In contrast, the SASE PIT within a PIT request is different. The SASE PIT ID represents an address space of an individual thread within the compute node 212. Each request in the super-PIT contains a SASE PIT, but when the I/O they represent completes, the I/O completion message created does not include a credit PIT. Only when the super-PIT has been drained of all requests, is a credit PIT issued for its address space.

The creation of a super-PIT on a compute node 200 occurs is described as follows. A super-PIT can be created whenever there are at least two I/O requests to a single ION 212 queued within the compute node 200. If the limit for super-PIT packets for that compute node 200 has already been reached on this ION 212, the compute node 200 will continue to queue up requests until a super-PIT ID is returned to it. The compute node 200 then issues another super-PIT message. Within the system driver, once queuing begins, per-ION queues will be required to create the super-PIT packets.

As discussed above, super-PIT messages can reduce the processing load on an ION 212 under workloads that are dominated by a large volume of small I/O requests. Super-PIT messages improve the performance of the destination node and improve the utilization of the interconnect fabric 106 due to an increase in average message size. However, the concept of super-PIT messages can be applied at the ION 212 to reduce the load on the compute node 200 created by small I/O workloads as well. Creating super-PIT messages on the ION 212 is a far different problem than creating them on the compute node 200. On the compute node 200, application threads creating I/O requests are subject to flow control to prevent the ION 212 from being overwhelmed.

The service rate of the disk subsystem is far lower than the rest of the ION 212 and will always be the ultimate limitation for ION 212 performance. Requests are blocked from entering the system until the ION 212 has sufficient resources to queue and eventually service the request. The point is that requests would queue on the compute node (or the application would be blocked) until resources are available on the ION 212. Resource starvation is not an issue on the compute node 200. When a compute node 200 application submits a request for I/O to the system, included as part of the request are the compute node 200 memory resources required to complete the I/O (the application thread buffer). For every I/O completion message the ION 212 needs to send to the compute node 200, it already has an allocated PIT ID (the SASE PIT ID). From the viewpoint of the ION 212, I/O completion messages already have the target buffer allocated and can be filled as soon as the data is ready. The I/O completion message is successful once it has been delivered (the ION 212 does not have to wait for the service time of a disk storage system at the compute node). Hence, the ION 212 cannot block due to flow control pressure from a compute node. To create super-PIT messages, the compute node took advantage of flow control queuing, an option the ION 212 does not have. Since the ION 212 does not have any resources to wait for, other than access to the BYNET, the opportunity to create super-PIT messages is far less.

Several approaches for creating super-PIT messages on the ION 212 may be employed. One approach is to delay I/O completion requests slightly to increase the opportunity of creating a super-PIT packet. If after a small delay, no new completion messages for the same node are ready, the message is sent as a normal PIT message. The problem with this technique is that any amount of time the request is delayed looking to create a super-PIT (to reduce up-call overhead on the compute node), there is a corresponding increase in total request service time. The net effect is a reduced load on the compute node 200, but may also slow the application. An adaptive delay time would be beneficial (depending on the average service rate to a compute node 200 and the total service time accumulated by a specific request). The second approach is a slight variation of the first. This would require each compute node 200 to supply each ION 212 with a delay time that would increase as the small I/O rate at the compute node increases. The point is to increase the window for creating super-PIT messages for a specific ION 212 when it is needed. The third approach would be to delay certain types of traffic such as small read or writes that were serviced directly by the cache and did not involve waiting for a storage 224 disk operation. While the cache reduces the average I/O latency through avoiding disk traffic for some percentage of the requests, the distribution of latencies is altered by cache hits. A small queue delay time for a cache hit request would not be a major increase in service time compared to that which included a disk operation. For those applications that are sensitive to service time distribution (where uniform response time is important to performance), a small delay to create a super-PIT packet on the ION 212 has the potential to improve overall system performance.

6. Large Block Support and Fragmented PIT Packets

Performance requirements for database applications are often independent of the size of the database. As the size of the database increases, the rate at which disk storage is examined must also increase proportionally to prevent erosion in application performance. Stated differently, for customer databases to grow in size, response time has to remain constant for a given query. The difficulty in meeting these requirements is that they are in direct conflict with the current trend in disk drive technology: disk drives are increasing in capacity, while their random I/O performance is remaining constant. One approach to mitigate this trend is to increase the average size of disk I/O operations as the capacity of the disk drive increases. Based on the current trends in storage capacity and the performance requirements, the average I/O size of 24 KB may increase to 128 KB in the very near future. More aggressive caching and delayed write techniques may also prove to be helpful for many workloads. Uneven technology growth in disk drives is not the only driver behind increasing I/O request sizes. As databases with BLOBS (binary large objects) start to become popular, objects with sizes reaching 1 MB and higher are becoming more common. Regardless of the specific cause, it is expected that systems will need to support large I/O objects whose size will continue to track the economics of disk storage.

There are several issues related to the transmission of large data objects between the ION 212 and compute nodes 200 using the PIT protocol. As described herein, the advantage of the PIT protocol is the pre-allocation of destination buffers to address the problems of flow control and end-point location. However, up-call semantics also require the identification (or allocation) of sufficient buffer space in which to deposit the message. The PIT protocol addresses this problem by having the send-side select the target PIT ID 906 where each message is to be deposited at the receiver. Large I/O writes clearly complicate the protocol, as message size could become a criteria for selecting a specific PIT ID 906 out of an available pool. Under periods of heavy load, there is the potential for situations where the sender has available PIT IDs 906 credits, but none of them meet the buffer size requirement for a large I/O request. Under the PIT protocol, if there is a wide population of data sizes to be sent, the send-side has to work with the receive-side to manage both the number and size of the PIT buffers. This creates a PIT buffer allocation size problem . . . that is, when creating a pool of PIT buffers, what is the roper distribution of buffer sizes for a pool of PIT buffer under a given workload? BYNET software imposes an additional maximum transfer unit (MTU) limit that complicates large I/O reads in addition to writes. I/O requests (both read and write) that exceed the BYNET MTU must be fragmented by the software protocol (the PIT protocol in this case) on the send-side and reassembled on the destination side. This creates the problem of memory fragmentation. Briefly, internal fragmentation is wasted space inside an allocated buffer. External fragmentation is wasted space outside the allocated buffers that are too small to satisfy any request. One solution would be to use only part of a larger PIT buffer, but this would cause unnecessary internal fragmentation if larger PIT buffers are used. Large PIT buffers wastes memory which hurts cost/performance.

In the present invention, the BYNET MTU and the PIT buffer size allocation problem is solved with the addition of two more types of PIT messages: the RT-PIT (round trip PIT) and the FRAG-PIT (fragmented PIT). Both the FRAG-PIT and the RT-PIT use a data pull model instead of the PIT data push model. (To push data, the send-side pushed the data to the destination. To pull data, the destination pulls the data from the source). FRAG-PIT messages are designed to support large data reads, while RT-PIT messages support large data writes. Both FRAG-PIT and RT-PIT are similar to super-PIT as they also use the ION PIT workload-injector to manage the flow of data.

a) RT-PIT Messages

When a compute node 200 wants to perform a large disk write operation to an ION 212, and the I/O write is greater in size than either the BYNET MTU or any available ION 212 PIT buffer, the compute node 200 will create a RT-PIT create message. A RT-PIT message operates in two phases: the boost phase followed by the round trip phase. In the boost phase, a list of source buffers for the data to be written is assigned a series of PIT IDs on the compute node 200. The fragmentation size of the source buffer is determined by the BYNET MTU and the size constraints that were specified during the ION first open protocol. This list of PIT IDs (with the corresponding buffer size) are placed in the payload of a single RT-PIT request message and will be PIT credits to destination ION 212. An additional PIT buffer is allocated from the compute node pool to be used directly by the RT-PIT protocol. The PIT ID of this additional buffer is placed in the credit field of the PIT header. The rest of the RT-PIT request is the same as a normal PIT write message. The compute node 200 then sends (boosts) this RT-PIT request message to the ION 212.

At the ION 212, the PIT workload-injector processes the RT-PIT request message in two steps. For each source side PIT ID 906, the workload-injector must request a PIT buffer from the ION cache that will match it in size (note this can be done all at once or one at a time depending on the memory space available in the ION buffer cache). By matching the PIT buffers, the ION 212 will dynamically allocate resources to match the write request. I/O can now proceed using a modified sequence of normal PIT transfers. Processing of the RT-PIT message now enters the round-trip phase where the workload-injector creates a RT-PIT start message for one (or more) matching pair(s) of source and destination PIT IDs (the option of sending one or a subset of matched PIT IDs remains at the discretion of the ION 212). The number of PIT IDs 906 in a single RT-PIT start message controls the granularity of data transfer inside the ION 212 (as discussed below).

This RT-PIT start message is sent back to the compute node 200, ending the boost phase of the RT-PIT message. On receipt of the RT-PIT start message, the compute node 200 starts to transfer the data to the ION 212 one PIT pair at a time using a normal PIT write message. The fragments do not have to be sent in-order by the compute node 200, as both the compute node 200 and ION 212 have sufficient data to handle lost fragments (the matched PIT pair specifies re-assembly order). When the ION 212 receives the PIT write message, the workload-injector is notified, which recognizes that this write request is part of a larger RT-PIT I/O operation. The workload-injector has two options for processing the PIT write: either pass the fragment to the cache routines to start the write operation, or wait for the transmission of the last fragment before starting the write. Starting the I/O early may allow the cache routines to pipeline the data flow to the disk drives (depending on the write cache policy), but risks a performance loss from the smaller I/O size. However, holding the I/O until all the fragments have arrived may place an undue burden on the cache system. Since the total size and number of fragments are known from the start, all the data needed to optimize the large I/O request under the current operating conditions is made by the cache system. On the compute node 200 side, the successful transmission of each PIT write operation causes the start of the next fragment write to commence when multiple fragments are contained in a single RT-PIT start message. When the last fragment in a single RT-PIT start command has been received, the request-injector passes the data to the cache system for processing similar to that of a normal write request. When the data is safe, an I/O completion message is created by the cache system and is sent back to the compute node 200 to signal the completion of this phase of processing (for the RT-PIT start operation). When there are more fragments remaining, another RT-PIT start command is created and sent to the compute node, thus repeating the cycle described above until all the fragments have been processed. When the workload-injector and the cache have completed the processing of the last fragment, a final I/O completion message with status is returned to the compute node to synchronize the end of all the processing for the RT-PIT request.

RT-PIT messages could be optimized with some changes to the BYNET. Consider the situation where the ION 212 has just received a RT-PIT request; the workload-injector on the ION 212 is matching up buffers on the compute node with the ION 212 to translate the large UO request into a number of smaller normal write requests. The synchronization is performed through the intermediate RT-PIT start commands. However, if the BYNET allowed a received channel program to perform a data pull, the intermediate step of sending a RT-PIT start command to the compute node could be eliminated. For the sake of discussion, we will call this mode of BYNET operation a loop-band message. A loop-band message is really two directed-band messages, one nested inside of the other. By way of example, when the workload-injector receives a RT-PIT request, it will process each fragment by creating a RT-PIT start message that contains the data needed to create a second PIT write message on the compute node. The RT-PIT start message transfers the template for the PIT write operation for a fragment to the compute node 200. The channel program executed on the compute node 200 (sent with the RT-PIT start message) deposits the payload on the send queue on the compute node BYNET driver. The payload looks like a request queued from the application thread that made the initial RT-PIT request. The payload will create a PIT write request using the pair of PIT IDs, source and destination, for this fragment sent by the workload-injector. The PIT write will deposit the fragment on the ION 212 and will notify the workload-injector it has arrived. The workload-injector will continue this cycle for each fragment until all has been processed. The performance improvement of loop-band messages is derived from the removal of the interrupt and compute node processing required for each RT-PIT start message.

FRAG-PIT messages are designed to support the operation of large I/O read requests from a compute node. When an application makes a large I/O read request, the compute node pins the target buffer and creates a list of PIT IDs that represent the target buffers of each fragment. Each PIT ID describes a scatter list comprised of the target buffer(s) for that fragment and an associated status buffer. The status buffer is updated when the data is sent, allowing the compute node to determine when each fragment has been processed. The size of each fragment is determined using the same algorithm as RT-PIT messages (see the section on RT-PIT above). These fields are assembled to create a FRAG-PIT.

The compute node 200 sends the FRAG-PIT request to the ION 212 where it is processed by the workload-injector. Included in this request are the virtual disk name, starting block number, and data length of the data source on the ION 212. The workload-injector operates on a FRAG-PIT request in a manner similar to a RT-PIT request. Each fragment within the FRAG-PIT request is processed as a separate PIT read request in cooperation with the cache system. The cache system can choose to handle each fragment independently or as a single read request, supplying the disk data back to the workload-injector when it is available. When a data fragment is supplied by the cache (either individually or part of a single I/O operation), the data for the large read request will begin to flow back to the compute node. For each fragment where the cache has made data available, the workload-injector sends that data fragment in a FRAG-PIT partial-completion message back to the compute node. Each FRAG-PIT partial-completion message transmits data similar to a regular PIT read request completion except that the FRAG-PIT partial-completion message will not generate an interrupt at the compute node when it is delivered. The last completed fragment is returned to the compute node with a FRAG-PIT full-completion message. A FRAG-PIT full-completion differs from a partial-completion message in that it signals the completion of the entire FRAG-PIT read request via an interrupt (a full up-call).

7. Implementation of a PIT Protocol on Other Network Devices

Much of the performance of the foregoing approach to network attached storage rests on the ability of the interconnect fabric 106 to support the PIT protocol. In the case of the BYNET, a low-level interface was created that is a close match for the PIT protocol. Other network interfaces, such as fibre channel are capable of supporting the PIT protocol as well.

E. Bermuda Triangle Protocol

The present invention provides data and I/O redundancy through the use of ION cliques 226 and write-back caching. ION cliques 226 comprise a plurality of IONS (typically deployed in pairs or dipoles), such as IONs 212 and 214 comprising a primary ION 212 and a buddy ION 214. The buddy ION 214 provides for data and I/O redundancy, by acting as a temporary store for copies of the primary IONs 212 modified cache pages. Each ION 212 in an ION clique 226 (illustrated as a pair of IONs or a Dipole) functions as a primary ION 212 for one group of volume sets and as the Buddy ION 214 for another.

To provide high availability and write-back caching, data must be stored safely in at least two locations before a write can be acknowledged to an application. This is sometimes accomplished using a backup copy of the cache memory or a high-speed sequential disk intent log. Failure to provide this redundant copy can lead to data loss if the storage controller fails after a write has been acknowledged but before the data has been recorded on permanent storage.

However, since the IONs 212 and 214 comprise physically separate computers, communication over the interconnect fabric 106 is required to maintain these backup copies. For optimum system performance, it is necessary to minimize the number of BYNET transmissions and interrupts associated with the write protocol while still utilizing write-back caching.

Figure 11:
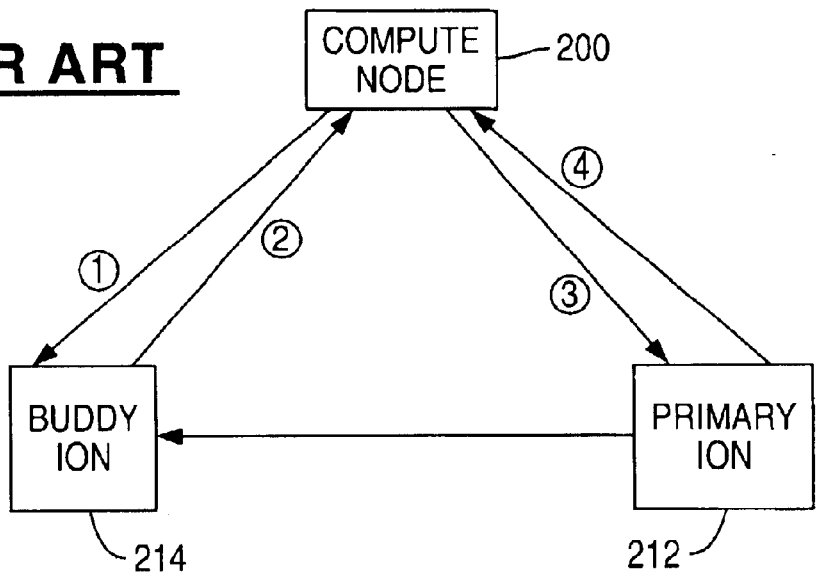
FIG. 11 is a diagram showing a protocol for writing data to a disk in a dipole.

FIG. 11 shows one possible protocol for writing data to a disk 224 in a dipole 226. In steps 1 and 3, the compute node 200 sends write requests to the primary ION 212 and the buddy ION 214. In steps 2 and 4, the IONs respond to the write requests. The write is considered complete when responses from both IONs 212 and 214 are received by the compute node 200. When the data is eventually written to disk, the primary ION 212 sends a purge request to the buddy ION 214, informing it that it no longer needs to keep a copy of the page of write data. Assuming "send complete" interrupts are suppressed on the sending side, this protocol requires at least five interrupts, since each message sent generates an interrupt on the compute node 200 or the IONs 212 and 214. This protocol also has the disadvantage of the need for the compute node 200 to be aware of the state of the primary 212 and buddy ION 214 to avoid waiting forever for a second response if one ION is down when the write is initiated.

Figure 12:
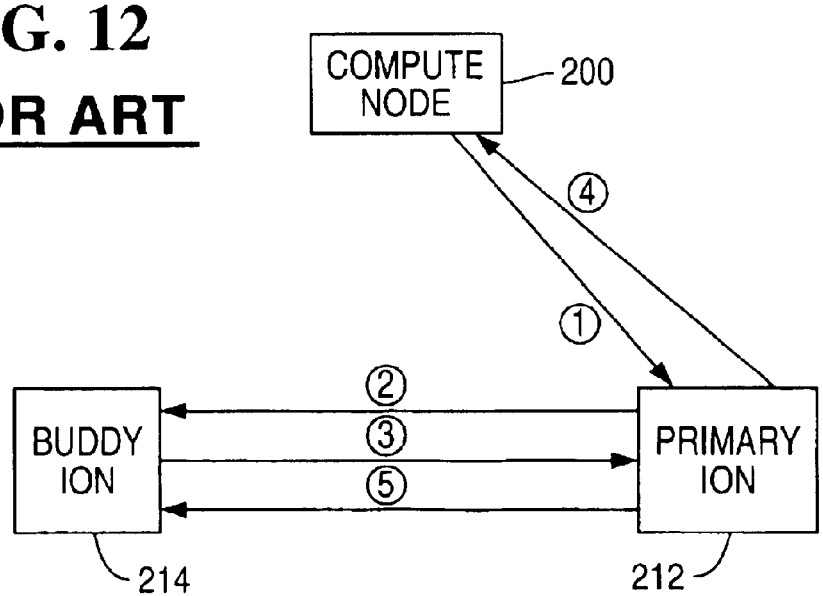
FIG. 12 is a diagram showing a second protocol for writing data to a disk in a dipole.

FIG. 12 depicts another possible protocol. This protocol directs the primary ION 212 to send write requests to the buddy ION 214, wait for a response, and send the acknowledgment back to the compute node 200. This protocol also requires at least five interrupts as well. The first interrupt occurs when the compute node 200 transmits the write request to the primary ION 212, as shown in step 1. The second interrupt occurs in step 2 when the primary ION 212 transmits data to the buddy ION 214. The third interrupt occurs in step 3 when the buddy ION 214 acknowledges receipt of the data. The fourth interrupt occurs in step 4 when the primary ION 212 responds to the compute node 200, and the final interrupt occurs at step 5 after the data has been safely transferred to disk and the primary ION 212 sends a purge request to the buddy ION 214.

FIG. 13 illustrates a protocol used in the present invention which minimizes the number of interrupts required to process a write request. This protocol is referred to as the Bermuda Triangle protocol.

First, the compute node 200 issues a write request with write data to the primary ION 212. The write request is transmitted via the interconnect fabric 106 to the primary ION 212. This is depicted by step 1. The primary ION 212 then stores the write data in a write back cache located in the memory 304 and sends the write data to the buddy ION 214. This is indicated by step 2. Next, the buddy ION 214 sends an acknowledgment message to the compute node 200 to acknowledge the write request. Finally, when the data is safely on disk, the primary ION 212 sends a purge request to the buddy ION 214. This purging step is shown in step 3 of FIG. 13. Because the foregoing protocol requires four steps instead of the five steps required by the methods depicted in FIGS. 11 and 12, it reduces the communication requirements for the data processing architecture 100 and increases throughput.

FIG. 14 is a diagram showing the foregoing operations in flow chart form. First, a write request is received 1402 in the primary ION 212 from the compute node 200. Then, the write data from the write request is forwarded 1404 from the primary ION 212 to the buddy ION 214. An acknowledgment message is transmitted 1406 from the buddy ION 214 to the compute node 200, and the write data stored in the buddy ION 214 is purged according the executed 1408 purge logic.

Figure 15:
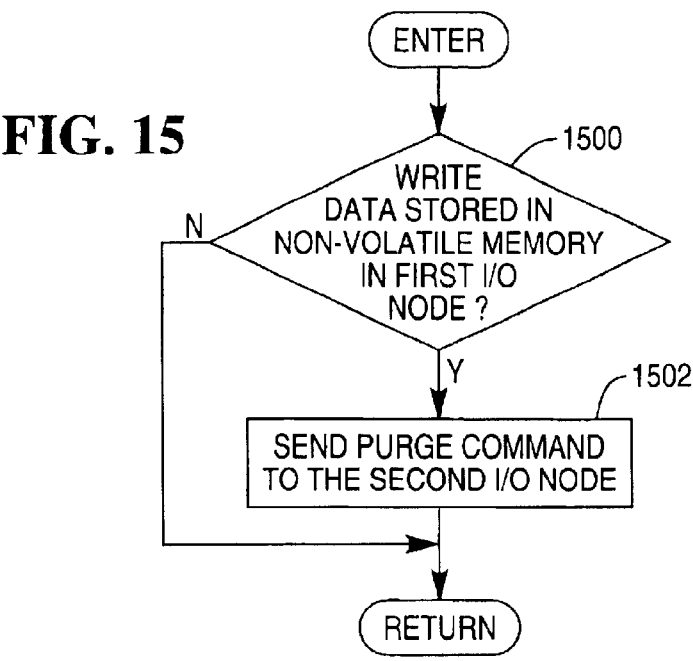
FIG. 15 is a flow chart showing the operations used to purge the memory of the buddy ION after the write data has been written to non-volatile storage in the primary ION.

FIG. 15 shows one embodiment of the purge logic. In this embodiment, a purge command is sent 1502 from the primary ION 212 to the buddy ION when the write data is stored into a non-volatile storage of the primary ION 212. Ordinarily, this occurs when the data is written to the media.

Figure 16:
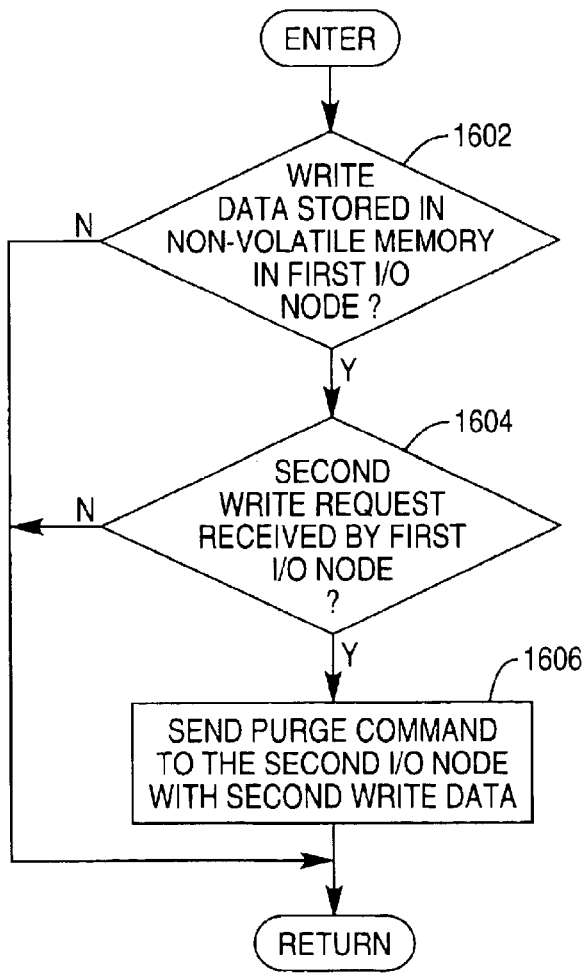
FIG. 16 is a flow chart showing alternative operations used to purge the memory of the buddy ION after write data has been written to non-volatile storage in the primary ION.

FIG. 16 shows another embodiment of the purge logic. This embodiment is similar to the embodiment shown in FIG. 15 in that a purge command is not sent until the write data is stored 1602 in a non volatile memory, but this embodiment also waits for a second write request to be received 1604 by the primary ION 212 before sending the purge command. Hence, interrupts are further reduced by delaying and combining purge requests with the data transmission of a subsequent write in to yield a three-interrupt protocol. An additional advantage of this protocol is that if the Buddy ION 214 is down when the write request is received, the primary ION 212 can process the request in write-back mode and acknowledge the write once the data is safely on disk. The compute node 200 does not need to know the status of the buddy ION 214. In one embodiment, a software timer or other device may be implemented to ensure that the final purge request is eventually sent, even if no further write requests are received by the primary ION 212.

The Bermuda Triangle Protocol enables write-back caching using fewer interrupts than conventional protocols, while maintaining data availability. This is possible because the buddy ION 214 performs the acknowledgment of write requests sent to the primary ION 212. Given that interrupt processing can be expensive on modern pipelined processors, this protocol, which can be used in a wide variety of distributed storage system architectures, results in lower overall system overhead and improved performance.

F. Compute Node

1. Overview

Compute nodes 200 run user applications 204. In prior art systems, a number of dedicated shared SCSI buses are used to enable equal storage access to the nodes within a cluster or a clique. In the present invention, storage is attached to the compute nodes 200 through one or more communication fabrics 106. This network-attached storage shares the communication fabrics 106 with inter-process communication (IPC) traffic among the user applications 204 distributed across the compute nodes 200. Storage requests from user applications 204 are encapsulated by the fabric/storage interface into IPC messages to storage management applications located on the IONs 212. These dedicated applications on the storage nodes convert the IPC messages into local cache or disk I/O operations and send the results back to the compute node 200 as required. To a user application 204, network attached storage and local attached storage is indistinguishable.

Read and write requests for virtual disk blocks arrive at the ION 212 via the interconnect fabric 106. Requests may be routed to a specific ION 212 through source initiated selection at the compute nodes 200. Every compute node 200 knows which ION 212 will be accepting requests for each fabric virtual disk in the system. A fabric virtual disk reflects a virtual disk model in which a unique storage extent is represented, but that storage extent does not imply nor encode physical locations of the physical disk(s) within the name.

Each compute node 200 maintains a list that maps fabric virtual disk names to ION dipoles 226. The list is created dynamically through coordination between the compute nodes 200 and IONs 212. During power up and fault recovery operations, the IONs 212 within a dipole 226 partition the virtual (and physical) disks between them and create a list of which virtual disks are owned by which ION 212. The other ION 214 (which does not own the virtual disk or storage resource) in the dipole 226 provides an alternative path to the virtual disk in case of failure.

This list is exported or advertised periodically across the interconnect fabric 106 to all of the other dipoles 226 and compute nodes 200. Compute nodes 200 use this data to create a master table of primary and secondary paths to each virtual disk in the system. An interconnect fabric driver within the compute node 200 then coordinates with the dipole 226 to route I/O requests. Dipoles 226 use this "self discovery" technique to detect and correct virtual disk naming inconsistencies that may occur when dipoles 226 are added and removed from an active system.

Applications running on the compute nodes 200 see a block interface model like a local disk for each fabric virtual disk that is exported to the compute node 200. As described earlier herein, the compute nodes 200 create an entry point to each fabric virtual disk at boot time, and update those entry points dynamically using a naming protocol established between the compute nodes 200 and the IONs 212.

Conclusion

In conclusion, a method and apparatus for write-back caching in a data storage and processing system has been described. The method comprises the steps of receiving a write request including write data from a compute node in a first I/O node, forwarding the write data from the first I/O node to a second I/O node, and sending an acknowledgment message to the compute node from the second I/O node after the write data is received by the second I/O node. After the data is written into non-volatile storage of the first I/O node, a purge request or command is sent to the second I/O node to purge the write data from the volatile memory of the second I/O node. In one embodiment, the purge request is not sent until the first I/O node receives a second write request, in which case, the purge request is sent in the same interrupt as the write data for the second write request. The processing system comprises a first and a second I/O node, each with means for receiving a write request from the compute node and forwarding that write data to the other I/O node. Each I/O node also comprises a means for sending an acknowledgment message back to the compute node directly, without sending the acknowledgment through the I/O node that sent the write data. The result is an I/O protocol that reduces the number of interrupts required to store data, while still implementing write back caching to improve storage speed and turnaround. The invention also can be described in terms of a program storage device, such as a hard disk, floppy disk, or a CD, which tangibly embodies instructions stored thereon for performing the instructions to practice the invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of write-back caching in a data storage system, comprising the steps of:

receiving a write request in a first I/O node from a compute node, the write request including write data;

forwarding the write data from the first I/O node to a second I/O node; and sending an acknowledgment message to the compute node from the second I/O node.

2. The method of claim 1, further comprising the step of sending a purge request from the first I/O node to the second I/O node.

3. The method of claim 2, wherein the purge request is sent when the write data is stored in a non-volatile storage in the first I/O node.

4. The method of claim 2, wherein the purge request is sent after the first I/O node receives a second write request subsequent to the first write request.

5. The method of claim 4, wherein the second write request includes second write data, and the method further comprises the step of sending the second write data and the purge request to the second I/O node in a single data interrupt.

6. The method of claim 1, wherein the compute node and the first I/O node and the second I/O node are communicatively coupled via an interconnect fabric.

7. The method of claim 1, wherein the compute node is coupled to the first I/O node and the second I/O node via an interconnect fabric, wherein the interconnect fabric comprises:

a network for connecting the compute nodes and I/O nodes via a plurality of network input ports and a plurality of network output ports, the network comprising a plurality of switch nodes arranged into more than $g(\log_b N)$ switch node stages, wherein b is a total number of switch node input/output ports, N is a total number of network input/output ports, and g(x) indicates a ceiling function providing the smallest integer not less than the argument x, the switch node stages thereby providing a plurality of paths between any network input port and network output port, the switch node stages being configured to provide a plurality of bounceback points at a highest switch node stage of the network, the bounceback points logically differentiating between switch nodes that load balance messages through the network from switch nodes that direct messages within the network.

8. An apparatus for write-back caching in a data storage system, comprising:

means for receiving a write request in a first I/O node from a compute node, the write request including write data;

means for forwarding the write data from the first I/O node to the second I/O node; and means for sending an acknowledgment message to the compute node from the second I/O node.

9. The apparatus of claim 8, further comprising means for sending a purge request from the first I/O node to the second I/O node.

10. The apparatus of claim 8, further comprising means for determining when the write data is stored in a non-volatile storage in the first I/O node; and means for sending the purge request when the write data is stored in the non-volatile storage.

11. The apparatus of claim 9, further comprising:

means for determining when a second write request is received; and means for sending the purge request to the second I/O node with the second write request.

12. The apparatus of claim 8, wherein the compute node and the first I/O node and the second I/O node are communicatively coupled via an interconnect fabric.

13. The apparatus of claim 8, wherein the compute node is coupled to the first I/O node and the second I/O node via an interconnect fabric, wherein the interconnect fabric comprises:

a network for connecting the compute nodes and I/O nodes via a plurality of network input ports and a plurality of network output ports, the network comprising a plurality of switch nodes arranged into more than $g(\log_b N)$ switch node stages, wherein b is a total number of switch node input/output ports, N is a total number of network input/output ports, and g(x) indicates a ceiling function providing the smallest integer not less than the argument x, the switch node stages thereby providing a plurality of paths between any network input port and network output port, the switch node stages being configured to provide a plurality of bounceback points at a highest switch node stage of the network, the bounceback points logically differentiating between switch nodes that load balance messages through the network from switch nodes that direct messages within the network.

14. A program storage device, readable by a computer, tangibly embodying one or more programs of instructions executable by the computer to perform method steps of write back caching in a data storage system, the method comprising the steps of:

receiving a write request in a first I/O node from a compute node, the write request including write data;

forwarding the write data from the first I/O node to the second I/O node; and sending an acknowledgment message to the compute node from the second I/O node.

15. The program storage device of claim 14, wherein the method steps further comprise the step of sending a purge message from the first I/O node to the second I/O node.

16. The program storage device of claim 15, wherein the purge request is sent when the write data is stored in a non-volatile storage in the first I/O node.

17. The program storage device of claim 15, wherein the purge request is sent after the first I/O node receives a second write request subsequent to the first write request.

18. The program storage device of claim 17, wherein the second write request includes second write data, and the method steps further comprises the step of sending the second write data and the purge request to the second I/O node in a single data interrupt.

* * * * *